United States Patent
Griot et al.

(10) Patent No.: US 9,894,637 B2
(45) Date of Patent: Feb. 13, 2018

(54) LOW COST PAGING

(71) Applicant: QUALCOMM Incorporated, San Diego, CA (US)

(72) Inventors: Miguel Griot, La Jolla, CA (US); Madhavan Srinivasan Vajapeyam, San Diego, CA (US); Haris Zisimopoulos, London (GB); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/077,740

(22) Filed: Mar. 22, 2016

(65) Prior Publication Data

US 2016/0286524 A1    Sep. 29, 2016

Related U.S. Application Data

(60) Provisional application No. 62/137,174, filed on Mar. 23, 2015.

(51) Int. Cl.
*H04W 68/02* (2009.01)
*H04L 12/24* (2006.01)
(Continued)

(52) U.S. Cl.
CPC ............ *H04W 68/025* (2013.01); *H04L 41/00* (2013.01); *H04W 4/005* (2013.01); *H04W 28/18* (2013.01)

(58) Field of Classification Search
CPC . H04W 24/02; H04W 72/082; H04W 84/045; H04W 4/00; H04W 72/0426; H04W 84/047; H04W 52/18; H04W 72/046; H04W 12/06; H04B 7/024; H04B 7/0617; H04B 7/0626; H04B 17/00;
(Continued)

(56) References Cited

U.S. PATENT DOCUMENTS

2010/0323711 A1* 12/2010 Damnjanovic ...... H04B 7/0617
                                                  455/450
2017/0034839 A1*  2/2017 Rubin ..................... H04L 67/28

FOREIGN PATENT DOCUMENTS

EP           2836032 A1    2/2015
WO     WO-2015019182 A2    2/2015

OTHER PUBLICATIONS

Ericsson, "Paging on Rel-13 Low Complexity and Coverage Enhanced UEs," 3GPP TSG-RAN WG2 #89, Athens, Greece, Tdoc R2-150457, Feb. 9-13, 2015, 7 pgs., 3rd Generation Partnership Project.
(Continued)

*Primary Examiner* — Diane Mizrahi
(74) *Attorney, Agent, or Firm* — Holland & Hart LLP

(57) ABSTRACT

Methods, systems, and apparatuses for wireless communication are described. A user equipment (UE) may establish a dynamic coverage enhancement (CE) configuration and then autonomously transition from one CE level to another while in idle mode. The network may blindly detect the CE change during a paging procedure. For example, a mobility management entity (MME) may store dynamic CE information, and it may provide the dynamic CE information to base stations when the UE is paged. In some cases, the base stations may autonomously retransmit paging messages at different CE levels based on the dynamic CE information. In other examples, the MME may direct the base station to retransmit at different CE levels.

28 Claims, 19 Drawing Sheets

(51) Int. Cl.
  *H04W 4/00* (2009.01)
  *H04W 28/18* (2009.01)
(58) Field of Classification Search
  CPC ..... H04B 7/04; H04L 25/0228; H04L 5/0035;
    H04L 5/0037; H04L 5/0048; H04L 5/005;
    H04L 5/0058; H04L 5/0073; H04L
    5/0094; H04L 25/03821; H04L 1/00;
    H04L 1/0026; H04L 1/0027; H04L
    43/0817; H04L 43/10; H04L 63/0861
  See application file for complete search history.

(56) References Cited

OTHER PUBLICATIONS

ISA/EPO, International Search Report and Written Opinion of the International Searching Authority, Int'l. App. No. PCT/US2016/023825, Jun. 16, 2016, European Patent Office, Rijswijk, NL, 17 pgs.
LG Electronics Inc., "Paging for Coverage Enhancement UE," 3GPP TSG-RAN2 Meeting #89, Athens, Greece, R2-150516, Feb. 9-13, 2015, 2 pgs., 3rd Generation Partnership Project.
Zte, "Further Considerations on SIB and Paging for MTC Enhancement," 3GPP TSG RAN WG1 Meeting #80, Athens, Greece, R1-150145, Feb. 9-13, 2015, 7 pgs., 3rd Generation Partnership Project.

\* cited by examiner

LOW COST PAGING

CROSS REFERENCES

The present application for patent claims priority to U.S. Provisional Patent Application No. 62/137,174 by Griot et al., entitled "Low Cost Paging," filed Mar. 23, 2015, assigned to the assignee hereof, and expressly incorporated by reference herein.

BACKGROUND

The following relates generally to wireless communication, and more specifically to low cost paging. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A wireless network may utilize coverage enhancement techniques to communicate with a wireless device. In some cases, the channel conditions between a base station and the wireless device may change, and so the appropriate level of coverage enhancement may increase. If this happens, a UE may not receive messages intended for it without coordinating a new CE level; however, coordinating a new CE level may limit the operating life of, or otherwise adversely affect, a power-limited device.

SUMMARY

A user equipment (UE), such as a low complexity machine type communication (MTC) device, may establish a dynamic coverage enhancement (CE) configuration and then autonomously transition from one CE level to another while in idle mode. The network serving the UE may blindly detect the CE change during a paging procedure. For example, a mobility management entity (MME) serving the UE may store the dynamic CE information, and the MME may provide the dynamic CE information to base stations within the network, e.g., when the MME pages the UE. In some cases, the base stations may autonomously retransmit paging messages at different CE levels based on the dynamic CE configuration. In other examples, the MME may direct the base station to retransmit at different CE levels. A base station that supports a dynamic CE configuration may enable dynamic CE if the base station receives an indication from the MME or the UE, or both, in various examples. In some examples, the UE and MME may coordinate the dynamic CE configuration via non-access stratum (NAS) signaling.

A method of wireless communication is described. The method may include establishing a dynamic CE configuration with a network entity, communicating in a connected mode utilizing a first CE level of the dynamic CE configuration, selecting a second CE level of the dynamic CE configuration while in an idle mode, and receiving a paging indication transmitted utilizing the second CE level while in the idle mode.

An apparatus for wireless communication is described. The apparatus may include means for establishing a dynamic CE configuration with a network entity, means for communicating in a connected mode utilizing a first CE level of the dynamic CE configuration, means for selecting a second CE level of the dynamic CE configuration while in an idle mode, and means for receiving a paging indication transmitted utilizing the second CE level while in the idle mode.

A further apparatus for wireless communication is described. The apparatus may include a processor, memory in electronic communication with the processor, and instructions stored in the memory and operable, when executed by the processor, to cause the processor to establish a dynamic CE configuration with a network entity, communicate in a connected mode utilizing a first CE level of the dynamic CE configuration, select a second CE level of the dynamic CE configuration while in an idle mode, and receive a paging indication transmitted utilizing the second CE level while in the idle mode.

A non-transitory computer-readable medium storing code for wireless communication is described. The code may include instructions executable to establish a dynamic CE configuration with a network entity, communicate in a connected mode utilizing a first CE level of the dynamic CE configuration, select a second CE level of the dynamic CE configuration while in an idle mode, and receive a paging indication transmitted utilizing the second CE level while in the idle mode.

Some examples of the method, apparatuses, or non-transitory computer-readable medium described herein may further include processes, features, means, or instructions for communicating in the connected mode utilizing the second CE level based at least in part on the paging indication. Additionally or alternatively, in some examples establishing a dynamic CE configuration with a network entity comprises indicating support for dynamic CE paging.

In some examples of the method, apparatuses, or non-transitory computer-readable medium described herein, the support is indicated to a mobility management entity (MME) via non-access stratum (NAS) signaling. Additionally or alternatively, in some examples the support is indicated to a base station.

In some examples of the method, apparatuses, or non-transitory computer-readable medium described herein, the support indication is based at least in part on a user configuration, an operator configuration, or both. Additionally or alternatively, in some examples the operator configuration is enabled via an indication of dynamic CE level enabled in a universal subscriber identity module (USIM), via an Open Mobile Alliance Device Management (OMA DM) indication, or both.

Some examples of the method, apparatuses, or non-transitory computer-readable medium described herein may further include processes, features, means, or instructions for refraining from signaling an indication that the second CE level has been selected based at least in part on the dynamic CE configuration. Additionally or alternatively, some examples may include processes, features, means, or instructions for monitoring system information for a dynamic CE support indication.

Some examples of the method, apparatuses, or non-transitory computer-readable medium described herein may further include processes, features, means, or instructions for determining that a base station supports the dynamic CE configuration based at least in part on the dynamic CE support indication, and reselecting a base station while in the idle mode based at least in part on the determination. Additionally or alternatively, some examples may include processes, features, means, or instructions for determining that a base station does not support the dynamic CE configuration based at least in part on the dynamic CE support indication, and refraining from reselecting the base station while in the idle mode based at least in part on the determination.

Some examples of the method, apparatuses, or non-transitory computer-readable medium described herein may further include processes, features, means, or instructions for measuring a channel condition, wherein selecting the second CE level is based at least in part on the channel condition. Additionally or alternatively, some examples may include processes, features, means, or instructions for determining that a CE configuration timer has expired, wherein selecting the second CE level is based at least in part the expiration of the CE configuration timer.

In some examples of the method, apparatuses, or non-transitory computer-readable medium described herein, the second CE level is selected based at least in part on a limitation that the second CE level is higher than the first CE level. Additionally or alternatively, in some examples the indication of support for dynamic CE level depends in part on configuration, where the configuration consists at least on one or more of user configuration or operator configuration wherein the operator configuration consists of one or more of the following an indication of dynamic CE level enabled in the USIM and indication via OMA DM.

A method of wireless communication at a base station is described. The method may include identifying a dynamic CE configuration for a wireless device, transmitting a first paging message for the wireless device according to a first CE level of the dynamic CE configuration, determining that the wireless device has not responded to the first paging message, and transmitting a second paging message for the wireless device according to a second CE level of the dynamic CE configuration based at least in part on the determination.

An apparatus for wireless communication is described. The apparatus may include means for identifying a dynamic CE configuration for a wireless device, means for transmitting a first paging message for the wireless device according to a first CE level of the dynamic CE configuration, means for determining that the wireless device has not responded to the first paging message, and means for transmitting a second paging message for the wireless device according to a second CE level of the dynamic CE configuration based at least in part on the determination.

A further apparatus for wireless communication is described. The apparatus may include a processor, memory in electronic communication with the processor, and instructions stored in the memory and operable, when executed by the processor, to cause the processor to identify a dynamic CE configuration for a wireless device, transmit a first paging message for the wireless device according to a first CE level of the dynamic CE configuration, determine that the wireless device has not responded to the first paging message, and transmit a second paging message for the wireless device according to a second CE level of the dynamic CE configuration based at least in part on the determination.

A non-transitory computer-readable medium storing code for wireless communication is described. The code may include instructions executable to identify a dynamic CE configuration for a wireless device, transmit a first paging message for the wireless device according to a first CE level of the dynamic CE configuration, determine that the wireless device has not responded to the first paging message, and transmit a second paging message for the wireless device according to a second CE level of the dynamic CE configuration based at least in part on the determination.

Some examples of the method, apparatuses, or non-transitory computer-readable medium described herein may further include processes, features, means, or instructions for determining that the wireless device is in an idle mode. Additionally or alternatively, some examples may include processes, features, means, or instructions for transmitting a third paging message for the wireless device according to the first CE level based at least in part on the determination.

In some examples of the method, apparatuses, or non-transitory computer-readable medium described herein, the third paging message is transmitted simultaneously with the second paging message. Additionally or alternatively, in some examples identifying the dynamic CE configuration comprises receiving NAS signaling from the wireless device.

Some examples of the method, apparatuses, or non-transitory computer-readable medium described herein may further include processes, features, means, or instructions for transmitting a dynamic CE support indication to the wireless device. Additionally or alternatively, some examples may include processes, features, means, or instructions for transmitting a dynamic CE support indication to a base station serving the wireless device.

In some examples of the method, apparatuses, or non-transitory computer-readable medium described herein, identifying the dynamic CE configuration comprises receiving a context release complete message from a base station comprising paging information, dynamic CE configuration information, or both. Additionally or alternatively, in some examples transmitting the first paging message or the second paging message comprises sending a paging request to a set of base stations in a tracking area.

Some examples of the method, apparatuses, or non-transitory computer-readable medium described herein may further include processes, features, means, or instructions for receiving a message from the wireless device. Additionally or alternatively, some examples may include processes, features, means, or instructions for transmitting a stop paging request based at least in part on the message from the wireless device.

Some examples of the method, apparatuses, or non-transitory computer-readable medium described herein may further include processes, features, means, or instructions for retransmitting the first paging message a threshold number of times, wherein transmitting the second paging message is based at least in part on retransmitting the first paging message the threshold number of times. Additionally or alternatively, in some examples transmitting the second paging message comprises indicating a CE level adjustment index indicating whether to use the first CE level, the second CE level, another CE level, or any combination thereof. Additionally or alternatively, in some examples transmitting the second paging message may include transmitting a number of retransmissions of the first paging message indicating whether to use the first CE level, the second CE level, another CE level, or any combination thereof.

Some examples of the method, apparatuses, or non-transitory computer-readable medium described herein may further include processes, features, means, or instructions for receiving a CE level adjustment index from a core network entity, wherein the second CE level is based at least in part on the adjustment index. Additionally or alternatively, some examples may include processes, features, means, or instructions for receiving additional information associated with the first CE level from a core network entity, wherein the second CE level is based at least in part on the additional information. Additionally or alternatively, some examples may include processes, features, means, or instructions for receiving a paging request from a core network entity, wherein transmitting the first paging message or transmitting the second paging message is based at least in part on the paging request.

Some examples of the method, apparatuses, or non-transitory computer-readable medium described herein may further include processes, features, means, or instructions for receiving a dynamic CE support indication from a core network entity. Some examples of the method, apparatuses, or non-transitory computer-readable medium described herein may further include processes, features, means, or instructions for receiving a dynamic CE value from a core network entity. Additionally or alternatively, some examples may include processes, features, means, or instructions for transmitting a radio resource control (RRC) configuration message to the wireless device comprising the dynamic CE configuration.

Some examples of the method, apparatuses, or non-transitory computer-readable medium described herein may further include processes, features, means, or instructions for transmitting a context release complete message to a core network entity comprising paging information, dynamic CE configuration information, or both. Additionally or alternatively, some examples may include processes, features, means, or instructions for broadcasting a dynamic CE support indication.

Some examples of the method, apparatuses, or non-transitory computer-readable medium described herein may further include processes, features, means, or instructions for configuring the wireless device with a CE configuration timer. Additionally or alternatively, in some examples the second CE level is based at least in part on a limitation that the second CE level is higher than the first CE level.

A method of wireless communication at a core network entity is described. In some examples, the method may include identifying a dynamic CE configuration for a wireless device, transmitting a first paging message for the wireless device to be used by a base station according to a first CE level of the dynamic CE configuration, determining that the wireless device has not responded to the first paging message, and transmitting additional information regarding the dynamic CE configuration based at least in part on the determination.

An apparatus for wireless communication is described. In some examples, the apparatus may include means for identifying a dynamic CE configuration for a wireless device, means for transmitting a first paging message for the wireless device to be used by a base station according to a first CE level of the dynamic CE configuration, means for determining that the wireless device has not responded to the first paging message, and means for transmitting additional information regarding the dynamic CE configuration based at least in part on the determination.

A further apparatus for wireless communication is described. In some examples, the apparatus may include a processor, memory in electronic communication with the processor, and instructions stored in the memory and operable, when executed by the processor, to cause the processor to identify a dynamic CE configuration for a wireless device, transmit a first paging message for the wireless device to be used by a base station according to a first CE level of the dynamic CE configuration, determine that the wireless device has not responded to the first paging message, and transmit additional information regarding the dynamic CE configuration based at least in part on the determination.

A non-transitory computer-readable medium storing code for wireless communication is described. In some examples, the code may include instructions executable to identify a dynamic CE configuration for a wireless device, transmit a first paging message for the wireless device to be used by a base station according to a first CE level of the dynamic CE configuration, determine that the wireless device has not responded to the first paging message, and transmit additional information regarding the dynamic CE configuration based at least in part on the determination.

Some examples of the method, apparatuses, or non-transitory computer-readable medium described herein may include processes, features, means, or instructions for determining that the wireless device is in an idle mode. Additionally or alternatively, in some examples transmitting additional information regarding the dynamic CE configuration may include transmitting a second paging message for the wireless device to be used by the base station based at least in part on the determination. Additionally or alternatively, some examples may include processes, features, means, or instructions for transmitting a third paging message for the wireless device to be used by the base station according to the first CE level based at least in part on the determination.

Some examples of the method, apparatuses, or non-transitory computer-readable medium described herein may include processes, features, means, or instructions for transmitting a dynamic CE support indication to a base station serving the wireless device. Additionally or alternatively, some examples may include processes, features, means, or instructions for transmitting a dynamic CE value to a base station serving the wireless device.

In some examples, identifying the dynamic CE configuration may include receiving a context release complete message from a base station comprising paging information or dynamic CE configuration information, or both.

Additionally or alternatively, some examples may include processes, features, means, or instructions for transmitting the first paging message or the second paging message may include sending a paging request to a set of base stations in a tracking area.

BRIEF DESCRIPTION OF THE DRAWINGS

Aspects of the disclosure are described in reference to the following figures.

DETAILED DESCRIPTION

A user equipment (UE), such as a low cost machine type communications (MTC) device, may establish a dynamic coverage enhancement (CE) configuration and then autonomously transition from one CE level to another while in idle mode. The network may blindly detect the CE change during the paging procedure.

Aspects of the disclosure are initially described in the context of a wireless communication system. Specific examples are then described in which one or more base stations may autonomously retransmit paging messages at different CE levels based on the dynamic CE configuration. Other examples are described in which the MME may direct the base station to retransmit at different CE levels. These and other aspects of the disclosure are further illustrated by and described with reference to apparatus diagrams, system diagrams, and flowcharts that relate to dynamic CE.

Figure 1:
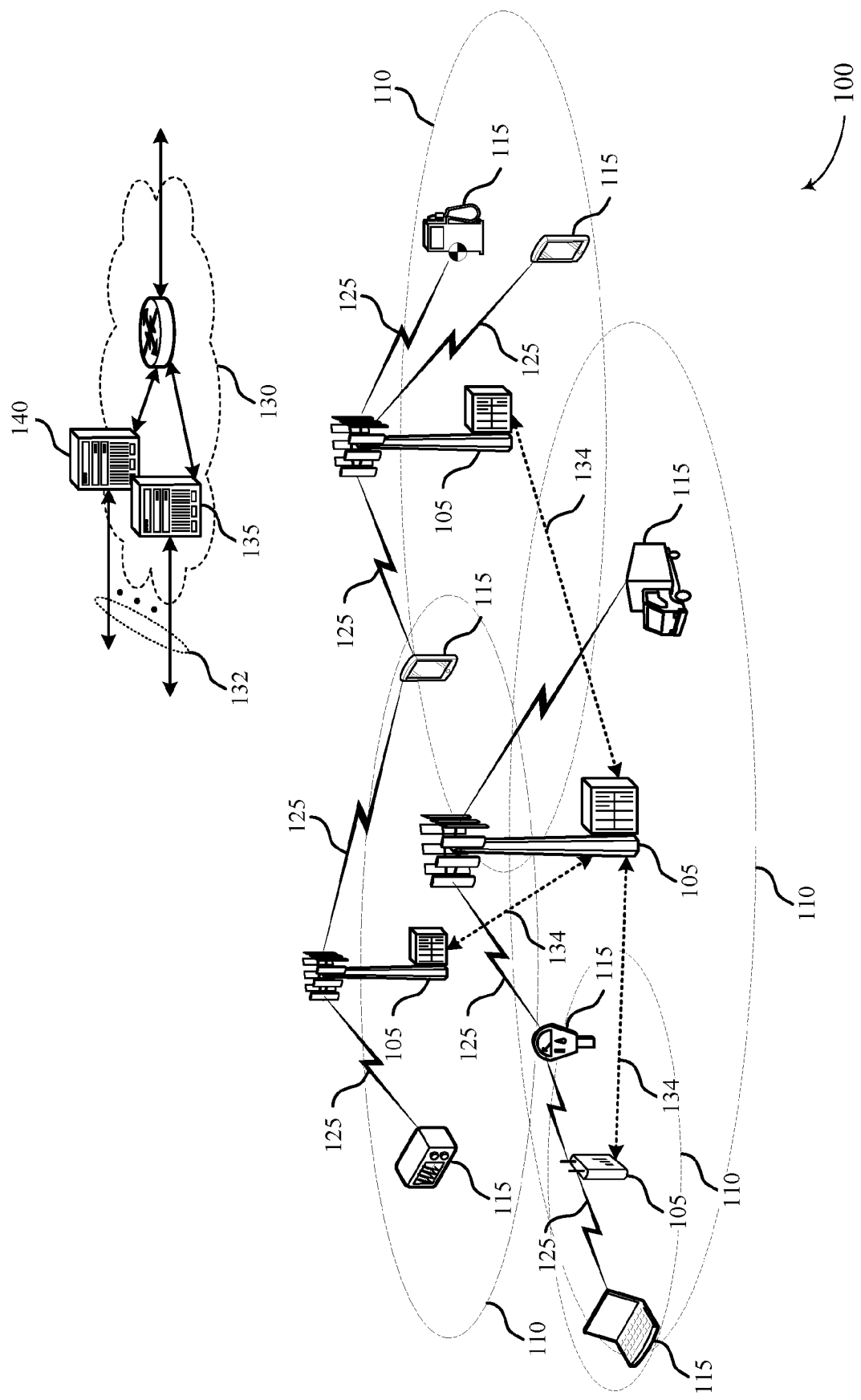
FIG. 1 illustrates an example of a wireless communications system that supports low cost paging in accordance with various aspects of the present disclosure.

FIG. 1 illustrates an example of a wireless communications system 100 that supports low cost paging in accordance with various aspects of the present disclosure. The wireless communications system 100 includes base stations 105, UEs 115, and a core network 130. In some examples, the wireless communications system 100 may be a Long Term Evolution (LTE)/LTE-advanced (LTE-a) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include uplink (UL) transmissions from a UE 115 to a base station 105, or downlink (DL) transmissions, from a base station 105 to a UE 115.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may communicate with base stations 105, and may dynamic CE.

Some types of wireless devices may provide for automated communication. Automated wireless devices may include those implementing Machine-to-Machine (M2M) communication, internet of things (IoT) communication or MTC. M2M, IoT, or machine type communication (MTC) may refer to data communication technologies that allow devices to communicate with one another or with the internet via a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, transaction-based business charging, and wearable devices (e.g., biometric monitoring devices). An MTC device may, in some examples, operate using half-duplex (one-way) communications at a reduced peak rate. MTC devices may also be configured to enter a power saving "deep sleep" mode when not engaging in active communications.

The base stations 105 may support, and may communicate with the core network 130 and with one another to provide dynamic CE information in order to support low cost paging. For example, the base stations 105 may interface with the core network 130 through backhaul links 132 (e.g., S1, etc.). The base stations 105 may also communicate with one another over backhaul links 134 (e.g., X2, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples.

The core network 130 may be an evolved packet core (EPC), which may include at least one mobility management entity (MME) 135, at least one serving gateway (S-GW) 140, and at least one PDN gateway (P-GW). The MME 135 may be the node that processes control plane signaling between the UE 115 and the EPC (i.e., core network 130). All user IP packets may be transferred through the S-GW 140, which itself may be connected to the P-GW. The P-GW may provide IP address allocation as well as other functions. The P-GW may be connected to the network operator's IP services. The operator's IP services may include the Internet, the Intranet, an IP Multimedia System (IMS), and a Packet-Switched (PS) Streaming Service (PSS).

MME 135 may be involved in the network connection activation/deactivation process and may also be involved in authenticating a user in coordination with an home subscriber server (HSS). Non Access Stratum (NAS) signaling—which may be used for the establishment of communication sessions and for maintaining continuous communications with UEs 115 as they move—may be initiated or directed at the MME 135. The MME 135 may also allocate a temporary identity to a UE 115. For example, the MME 135 may allocate a globally unique temporary identity (GUTI) to a UE 115 that includes identification information for the MME 135 as well as a temporary identity for the UE 115. A GUTI may minimize the frequency with which a persistent identity, e.g., an international mobile subscriber identity (IMSI), is transmitted within the network. The MME 135 may also check whether a UE 115 is authorized to camp on a service provider's Public Land Mobile Network (PLMN), and may manage security keys for non-access stratum (NAS) signaling such as attachment procedures for UEs 115 and handles the security key management.

In some cases, wireless communication system 100 may utilize coverage enhancement (CE) techniques to improve the quality of a communications link 125 for UEs 115 located at a cell edge, operating with low power transceivers, or experiencing high interference or path loss. CE techniques may include increase transmission time interval (TTI) bundling, HARQ retransmission, physical uplink shared channel (PUSCH) hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a negative acknowledgement (NACK) before retransmitting redundancy versions. This may be effective for users engaging in voice over Long Term evolution (VoLTE) or VOIP communications. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.).

A UE 115 may enter an idle mode and periodically wake up to receive paging messages. For example, the UE 115 may be configured with a DRX cycle, which may include idle mode operation. A DRX cycle consists of an "On Duration" when the UE 115 may monitor for control information (e.g., on PDCCH) and a "DRX period" when the UE 115 may power down radio components and transition to an idle mode.

In some cases, a UE 115 in idle mode may be assigned a paging radio network temporary identity (P-RNTI). If the S-GW receives data for the UE 115, it may notify the MME, which may send a paging message to every base station 105 within an area known as a tracking area. Each base station 105 within the tracking area may send a paging message with the P-RNTI. Thus, the UE may remain in idle without updating the MME until it leaves the tracking area.

A base station 105 may, for instance, page a UE 115 using one of four CE levels (e.g., no CE, 5 dB CE, 10 dB CE, or 15 DB CE), which may be either dynamic or static CE levels. The UE 115 may be an MTC device and may operate using an assigned CE corresponding to the CE level used for the paging procedure. The UE 115 may determine which CE level to use based on measured channel conditions. Channel conditions may change frequently for a UE 115 that is moving; therefore, the device may choose a dynamic or semi-static CE level (e.g., 5 dB) based on a worst case assessment to save power or reduce overhead. Channel conditions for a device that is quasi-stationary may change at slower rates. Therefore, the device may dynamically determine a new CE level after performing a channel assessment.

In some cases, the MME 135 may store the CE levels and other paging information for one or more CE enabled devices. For example, the MME 135 may maintain information for a UE 115 when the UE 115 moves to the RRC idle state. In another example, a base station may determine the CE level of the UE 115 supporting a dynamic CE configuration during RRC-Connected operation. The base station 105 may then pass the associated CE level to the MME 135 for storage. In some cases, the UE 115 supporting a dynamic CE configuration may enter an idle state. While in the idle the state the device may continue to monitor channel characteristics. In some cases, the UE 115 supporting a dynamic CE configuration may use the same CE level that was used in the connected state. In other cases, the UE 115 supporting a dynamic CE configuration may move to a higher CE level (e.g., no CE→5 dB CE, 5 dB CE→10 dB CE, etc.) based on the measured channel conditions.

Since the UE 115 supporting a dynamic CE configuration may be in an idle state, the CE level change may occur without the network's knowledge. Therefore, a base station 105 may page the UE 115 supporting a dynamic CE configuration using a CE level that the UE 115 supporting a dynamic CE configuration is no longer using (e.g., based on paging information provided by the MME 135). The UE 115 supporting a dynamic CE configuration may explicitly indicate the CE level to the network upon successfully receiving a paging message and reconnecting to the network. However, reconnecting to the network may increase signal overhead and power consumption, and it may be unnecessary if the UE 115 supporting a dynamic CE configuration is not paged prior to the next UE initiated connection.

In some cases, a UE 115 in idle mode may perform a cell selection procedure to establish a connection with a base station 105 or to reselect a neighboring cell with better performance or higher priority. The selection procedure may include a determination of whether a candidate cell meets minimum selection criteria (S-criteria) and to select among several available cells. S-criteria may include reference signal received power (RSRP) (or reference signal received quality (RSRQ)), a minimum signal power threshold, a public land mobile network (PLMN) priority offset, a maximum transmit power, and a hysteresis parameter (to avoid ping-ponging between cells). Each cell may transmit its own minimum RSRP, cell priority, and maximum transmit power, and CE capabilities in broadcast system information messages. Such information may be broadcast in system information blocks (SIBs); and S-criteria, CE capabilities and the like may be broadcast in SIB1. Cells may also convey corresponding values for neighboring cells (e.g., in SIB4 and SIB5).

A UE 115 may begin a cell selection procedure by identifying a set of available PLMNs, selecting the highest priority PLMN (e.g., the home PLMN), and then selecting the best available cell in the selected PLMN. If a UE 115 is camped on a cell, it may periodically perform a cell search and rank available cells based on the S-criteria. If the UE 115 determines that a non-serving neighbor cell has qualifying S-criteria (e.g., the signal strength is sufficiently high), and the rank of the neighbor cell is higher than the rank of the serving cell, then the UE may reselect to the higher rank cell. If the UE 115 performs the cell search while connected to a visitor public land mobile network (VPLMN), it may use the priority offset to give preference to a home PLMN (or another higher priority PLMN).

Thus, a UE 115 may refrain from indicating a change in CE level to the network, and the network may use blind adjustments of the CE level to determine the correct CE level associated with the UE 115 supporting a dynamic CE configuration. In some examples, the UE 115 supporting a dynamic CE configuration may send an initial CE level and a dynamic CE level indicator to a base station 105. The MME 135 may store context information for the UE 115 supporting a dynamic CE configuration including CE level information. The UE 115 supporting a dynamic CE configuration may enter the idle mode, and the MME 135 may send a paging request for the UE 115 supporting a dynamic CE configuration to a base station 105. The paging request may include the last known CE level for the UE 115 supporting a dynamic CE configuration and an indicator that dynamic CE level adjustment is enabled for the UE 115. The base station 105 may then page the UE 115 using the last known CE level. If the base station 105 does not receive a response from the UE 115 supporting a dynamic CE configuration, the base station 105 may page the UE 115 again using a second CE level (e.g., 0 CE→5 dB CE). The base station 105 may continue paging at different CE levels until the UE 115 is reached or until a maximum number of pages has been performed.

Figure 2:
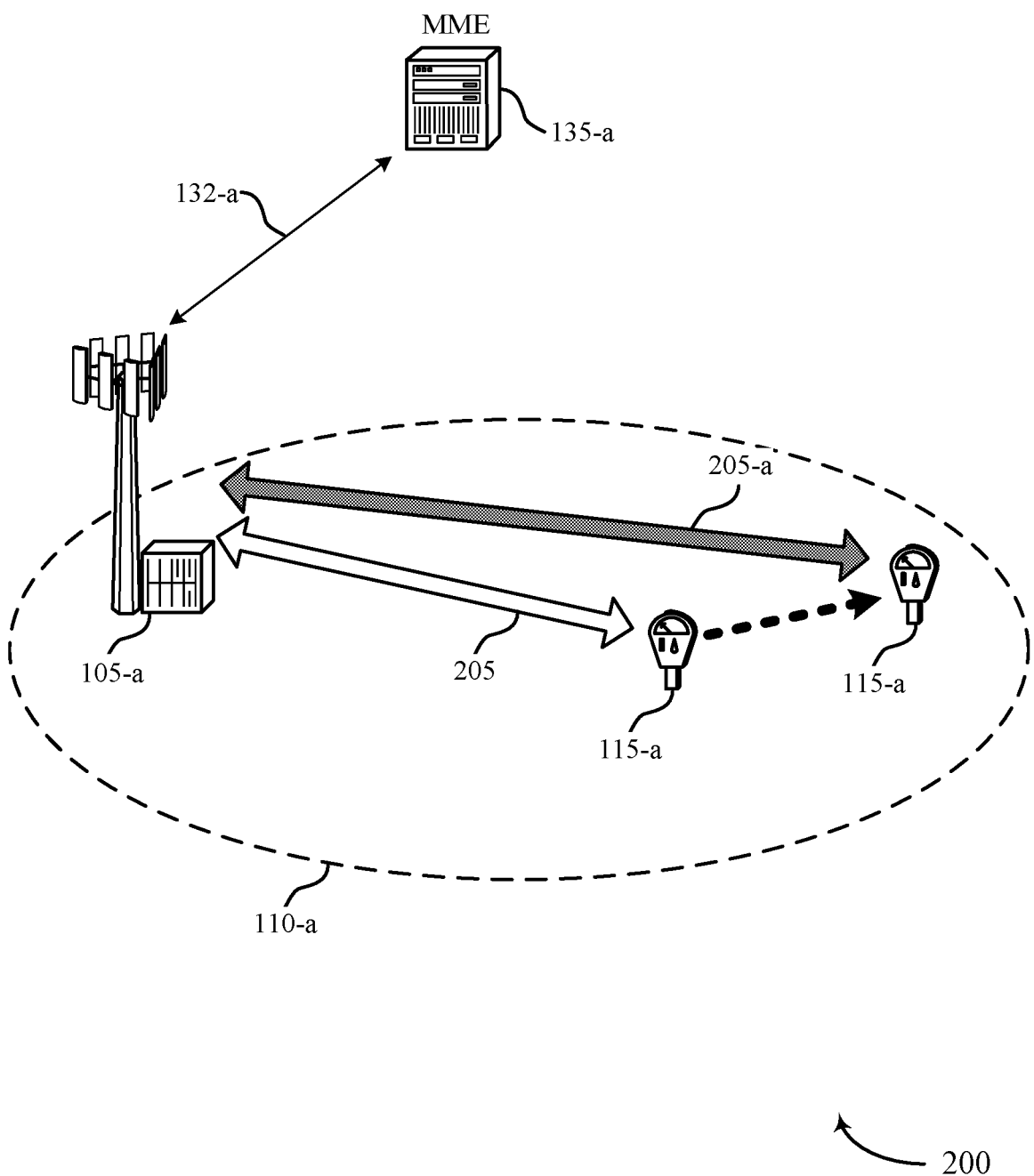
FIG. 2 illustrates an example of a wireless communications system that supports low cost paging in accordance with various aspects of the present disclosure.

FIG. 2 illustrates an example of a wireless communication system 200 for low cost paging in accordance with various aspects of the present disclosure. That is, wireless communication system 200 may illustrate aspects of or operation in wireless communication system 100, in which a UE 115 establishes a dynamic CE configuration and then autonomously transitions or moves from one CE level to another while in idle mode. Wireless communications system 200 may include UE 115-*a*, base station 105-*a*, and MME 135-*a*, which may be examples of a UE 115, base station 105, or MME 135-*a*; base station 105-*a* and UE 115-*a* may communicate with one another via communications link 205, which may be an RRC connection, when UE 115-*a* is within coverage area 110-*a*; base station 105-*a* and MME 135-*a* may communicate with one another through backhaul link 132-*a* as generally described with reference to FIG. 1.

In some examples, UE 115-*a* may be configured to request dynamic CE level paging (e.g., as opposed to static CE level paging). This may be based on the type or category of device of UE 115. For example, wearables or devices used in meters or sensors (which may be semi-statically positioned) may be configured for dynamic CE level paging, and UE 115 may be such a device.

UE 115-*a* may establish an RRC connection 205 with base station 105-*a*. UE 115-*a* and base station 105-*a* may determine an appropriate CE level (e.g., from a limited selection of CE options supported by the network) based on channel conditions. If UE 115-*a* enters idle mode upon connection release, the base station 105-*a* may pass context information, including the last known CE level, to MME 135-*a*. While in the idle state, base station 105-*a* may remove the context information for UE 115-*a* from memory and UE 115-*a* may move to a new location within coverage area 110-*a* (e.g., near the edge of the coverage are 110-*a*). UE 115-*a* may take channel measurements at the new location. In some cases, UE 115-*a* may determine that a more aggressive CE level (e.g., 10 dB CE) is appropriate based on the channel measurements and may change an associated CE level. However, since UE 115-*a* may be operating in the idle state, UE 115-*a* may refrain from indicating the change to the network (e.g., base station 105-*a* or MME 135-*a*), which may allow UE 115-*a* to conserve battery power or other resources.

Subsequently, MME 135-*a* may receive a notification of pending data for UE 115-*a* while UE 115-*a* is in the idle state; for instance, S-GW 140 (FIG. 1) may notify MME 135-*a* of pending data for UE 115-*a*. MME 135-*a* may then send a paging request to some or all base stations 105 within the tracking area for UE 115-*a*, including base station 105-*a*. The paging request may include context information for UE 115-*a*, including the last known CE level, the UE category, and an indication that dynamic CE level adjustment is enabled for UE 115-*a*. Base station 105-*a* may then page UE 115-*a* according to the received context information. However, since UE 115-*a* may have changed the CE level (e.g., to 10 dB CE), base station 105-*a* may transmit using the wrong CE level (e.g., 5 dB CE). In some cases, the CE level may determine resources used, modulation and coding scheme (MCS) or other aspects of the paging communication.

Accordingly, UE 115-*a* may fail to decode and respond to the paging request. Base station 105-*a* may then begin blind CE level adjustment. Base station 105-*a* may page UE 115-*a* a second time using a second CE level (e.g., 10 dB CE). In this case, UE 115-*a* may successfully decode and respond to the second page based on the second CE level and the CE level set at the UE 115-*a*. Base station 105-*a* may then establish an subsequent RRC connection 205-*a* with UE 115-*a*.

Establishing a dynamic CE configuration may include coordination between UE 115-*a*, base station 105-*a* and ME 135-*a*. For example, an indication of support from each device may be used. In one approach, RRC negotiation occurs between UE 115-*a* and base station 105-*a*, with an MME support indication in S1. That is, MME 135-*a* may send an indication to base station 105-*a* via S1 that dynamic CE level paging is possible (e.g., the core network indicates supports for dynamic CE). Then UE 115-*a* may indicate support for dynamic CE to base station 105-*a*. Base station 105-*a* may enable dynamic CE after receiving authorization from MME 135-*a*, and, in some examples, based on the indication from UE 115-*a*. Base station 105-*a* may explicitly signal the dynamic CE configuration to UE 115-*a* via RRC configuration. Base station 105-*a* may then confirm to MME 135-*a* that dynamic CE paging has been enabled via 51.

In another approach, NAS negotiation between UE 115-*a* and MME 135-*a* may be used to establish the dynamic CE configuration. UE 115-*a* may first provide an indication to MME 135-*a* in NAS for dynamic CE level support. MME 135-*a* may then provide an indication that it supports dynamic CE level paging to UE 115-*a*. MME 135-*a* may also provide an indication to base station 105-*a* for dynamic CE reporting in the S1 UE context. UE 115-*a* may monitor the CE levels from system information, and base station 105-*a* may report the selected CE level to MME 135-*a* in the S1 release message.

In some cases, cell selection or re-selection may depend on support for dynamic CE. For example, when UE 115-*a* is configured with a certain CE level, if a new cell supports that CE level (and in some cases, if the new cell supports dynamic CE paging procedures), UE 115-*a* may camp on it. UE 115-*a* may acquire the supported CE levels of new cell by, for instance, directly acquiring the supported CE levels from the system information (e.g., a master information block (MIB) or SIB of new cell), or indirectly by acquiring the supported CE levels in a SIB from a neighbor cell that UE 115-*a* previously camped on. If the CE level or configuration is not supported by the new cell, UE 115-*a* may select a different cell. In some cases, UE 115-*a* determines (e.g., based on channel measurements) the appropriate CE level on new cell. If the identified CE level is supported, UE 115-*a* may camp on the cell and monitor paging at new CE level. Otherwise, UE 115-*a* may attempt to select a new cell to camp. If no new cell found UE 115-*a* may camp on the best available cell (e.g., based on RSRP). Alternatively, UE 115-*a* may camp on the cell with best combination of signal strength and CE support.

Figure 3:
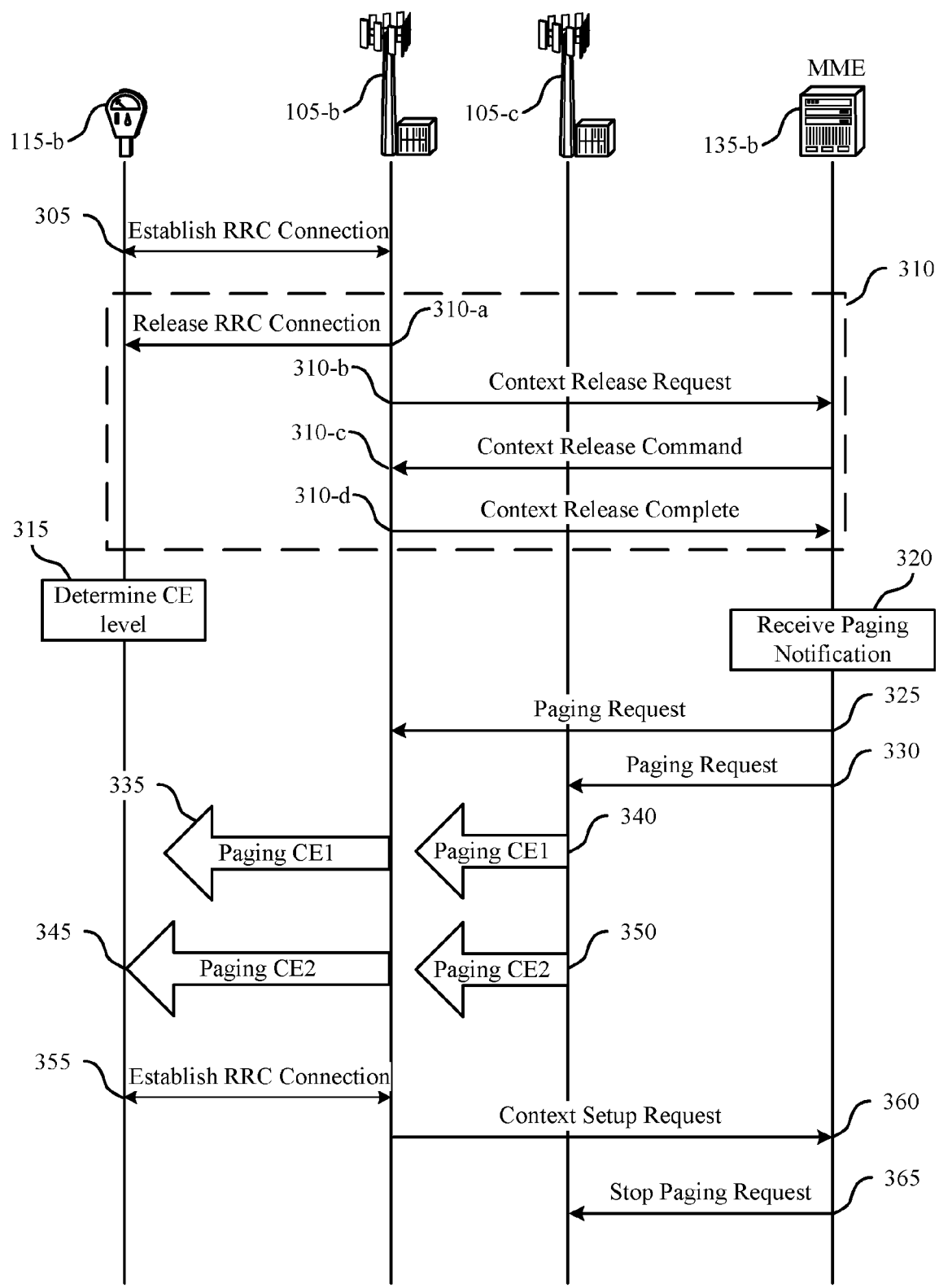
FIGS. 3-4 illustrate examples of process flows in a system or systems that support low cost paging in accordance with various aspects of the present disclosure.

FIG. 3 illustrates an example of a process flow 300 in a system that supports low cost paging in accordance with various aspects of the present disclosure. Process flow 300 may include operations performed by UE 115-*b*, base station 105-*b*, base station 105-*c*, and MME 135-*b*, which may be examples of a UE 115, base stations 105, and an MME 135-*b*, each of which may be examples of corresponding devices described above with reference to FIGS. 1 and 2. In some examples, UE 115-*b* may establish a connection based on a first CE level with base station 105-*b*, and upon entering an idle state the first CE level may be stored at MME 135-*b*. UE 115-*b* may continue to monitor channel conditions, and may select a second CE level without indicating the change in CE level to the network (e.g., base station 105-*b*, base station 105-*c*, or MME 135-*b*). MME 135-*b* may receive a paging notification for UE 115-*b* and may send a paging request, including the first CE level and dynamic CE level indicator, to base station 105-*b* and neighboring base station 105-*c*. Base station 105-*b* and base station 105-*c* may both be located in the same tracking area and may both blindly transmit multiple paging messages to UE 115-*b* at different CE levels until a response is received.

At step 305, UE 115-*b* and base station 105-*b* may establish an RRC connection. Establishing the RRC connection may include sending context information (e.g., device ID, UE-capabilities, CE level, dynamic CE indication, etc.) for UE 115-*b* to MME 135-*b*, where the information may be stored. In some cases, the information may be stored upon establishing the connection, but in some cases, the information is stored upon connection release. The stored information may be transparent to MME 135-*b*. In some examples, the base station 105-*b* may send an additional message to MME 135-*b* notifying MME 135-*b* that the UE 115-*b* is enabled for dynamic CE level adjustment. In other cases, UE 115-*b* may directly notify MME 135-*b* via the non-access stratum (NAS).

In some examples, establishing a dynamic CE configuration includes indicating support for dynamic CE paging. The support may be indicated to MME 135-*b* via NAS signaling. In some examples, the support is indicated to a base station. In some examples, the support indication is based on a user configuration, an operator configuration, or both. The operator configuration may be enabled via an indication of dynamic CE level enabled in a universal subscriber identity module (USIM), via an Open Mobile Alliance Device Management (OMA DM) indication, or both.

At step 310, the network may perform an RRC release procedure. In some cases, the release procedure may occur if UE 115-*b* enters into an idle mode. The RRC release procedure may include releasing the RRC connection 310-*a* between UE 115-*b* and base station 105-*b*, sending a context release request 310-*b* from base station 105-*b* to MME 135-*b*, sending a context release command 310-*c* from MME 135-*b* to base station 105-*b*, and responding to MME 135-*b* indicating that the context release is complete 310-*d*.

At step 315, UE 115-*b* may determine a CE level based on monitoring channel conditions. Determining the CE level may include performing channel measurements to determine whether a higher CE level may be used. For example, if UE 115-*b* determines that the channel measurements cross a threshold level, the UE 115-*b* may select a new CE level. For instance, UE 115-*b* may change the CE level from the first CE level (e.g., 5 dB CE) to the second CE level (e.g., 10 dB CE). In some cases, the second CE level selected by UE 115-*b* may not be advertised to the network, such as to base stations 105-*b* and 105-*c* and MME 135-*b*.

In some cases, UE 115-*b* may select a new CE level based on determining that a CE configuration timer has expired. In some examples, the second CE level is selected based on a limitation that the second CE level is higher than the first CE level.

At step 320, MME 135-*b* may receive a paging notification for UE 115-*b*. A paging notification may include receiving a downlink data notification message from the S-GW directing MME 135-*b* to page the desired UE 115-*b*. MME 135-*b* may then send paging requests 325 and 330 to each base station, such as base stations 105-*b* and 105-*c*, in the last known tracking area. The paging request 325 and 330 may include the stored context information, such as the last known CE level (e.g., 5 dB CE) and the dynamic CE indicator, for UE 115-*b*.

In some examples, methods of wireless communication at a core network entity, may be performed. As one example of a core network entity, an MME (e.g., MME 135-*b*) may perform one or more elements of the methods of wireless communication. In some examples, the methods may include identifying a dynamic CE configuration for a wireless device, transmitting a first paging message for the wireless device to be used by a base station according to a first CE level of the dynamic CE configuration, determining that the wireless device has not responded to the first paging message, and transmitting additional information regarding the dynamic CE configuration based at least in part on the determination.

In some examples, the methods may include determining that the wireless device is in an idle mode. In some examples, transmitting additional information regarding the dynamic CE configuration may include transmitting a second paging message for the wireless device to be used by the base station based at least in part on the determination.

Additionally, or alternatively, the methods may include transmitting a third paging message for the wireless device to be used by the base station according to the first CE level based at least in part on the determination. In some examples, the methods may include transmitting a dynamic CE support indication to a base station serving the wireless device. Additionally, or alternatively, the methods may include transmitting a dynamic CE value to a base station serving the wireless device. In some examples, identifying the dynamic CE configuration may include receiving a context release complete message from a base station comprising paging information or dynamic CE configuration information, or both. In some examples, transmitting the first paging message or the second paging message may include sending a paging request to a set of base stations in a tracking area.

At step 335 and 340, base stations 105-*b* and 105-*c* (which may be located in the last known tracking area of UE 115-*b*, and may be examples of the paging set selected by MME 135-*b*), may both transmit paging messages based on the received paging requests and according to the first CE level (e.g., 5 dB CE). Base stations 105-*b* and 105-*c* may wait for a response from UE 115-*b*. However, since base station 105-*b* and 105-*c* are transmitting the paging message based on the first CE level and not the second CE level, UE 115-*b* may fail to receive the page. In some cases, the base stations may send subsequent paging messages at different CE levels (i.e., blindly adjust the CE level).

At step 345 and 350, base stations 105-*b* and 105-*c* may both transmit a second paging message based on the received paging requests and according to a second CE level. In some cases, base stations 105-*b* and 105-*c* may transmit at the second CE level based on receiving the indication that UE 115-*b* is enable for dynamic CE operation. In some cases, the base stations 105-*b* and 105-*c* may increment the CE level one level based on the first CE level (e.g., 5 dB CE→10 dB CE). The base stations 105-*b* and 105-*c* may autonomously continue incrementing the CE level until a response is received from UE 115-*b* or until the maximum CE level was reached. In other cases, the base stations 105-*b* and 105-*c* may transmit one or more paging messages to UE 115-*b*. For instance, base stations 105-*b* and 105-*c* may send two paging messages, one according to a first CE level (e.g., 5 dB CE) and another according to a second CE level (e.g., 10 dB CE). The base stations 105-*b* and 105-*c* may continue sending additional paging messages for a next CE level until a response is received from UE 115-*b* or until the maximum CE level was reached (i.e., no CE→5 dB CE, 5 dB CE→10 dB CE, 10 dB CE→15 dB CE, etc.). In some cases, the second CE level (e.g., 10 dB CE) used for transmitting the second paging message may correspond with the CE level set at UE 115-*b*.

In some cases, base stations 105-*b* and 105-*c* may receive a second paging request for UE 115-*b* from MIME 135-*b* while blindly adjusting the CE level. The base station 105-*b* and 105-*c* may thus transmit two paging messages, one at the CE level associated with the second paging request and the other at a CE level subsequent to the last paging message (e.g., no CE and 10 dB CE).

At step 355, UE 115-*b* may establish an RRC connection with base station 105-*b* after successfully receiving a paging request sent from base station 105-*b*.

At step 360, base station 105-*b* may send the updated context information (e.g., device ID, UE-capabilities, CE level, dynamic CE indication, etc.) for UE 115-*b* to MME 135-*b*, where the information may be stored.

At step 365, MME 135-*b* may send a stop paging request to selected base stations in the tracking area, such as base station 105-*c*, based on the successful establishment of the RRC connection.

Figure 4:
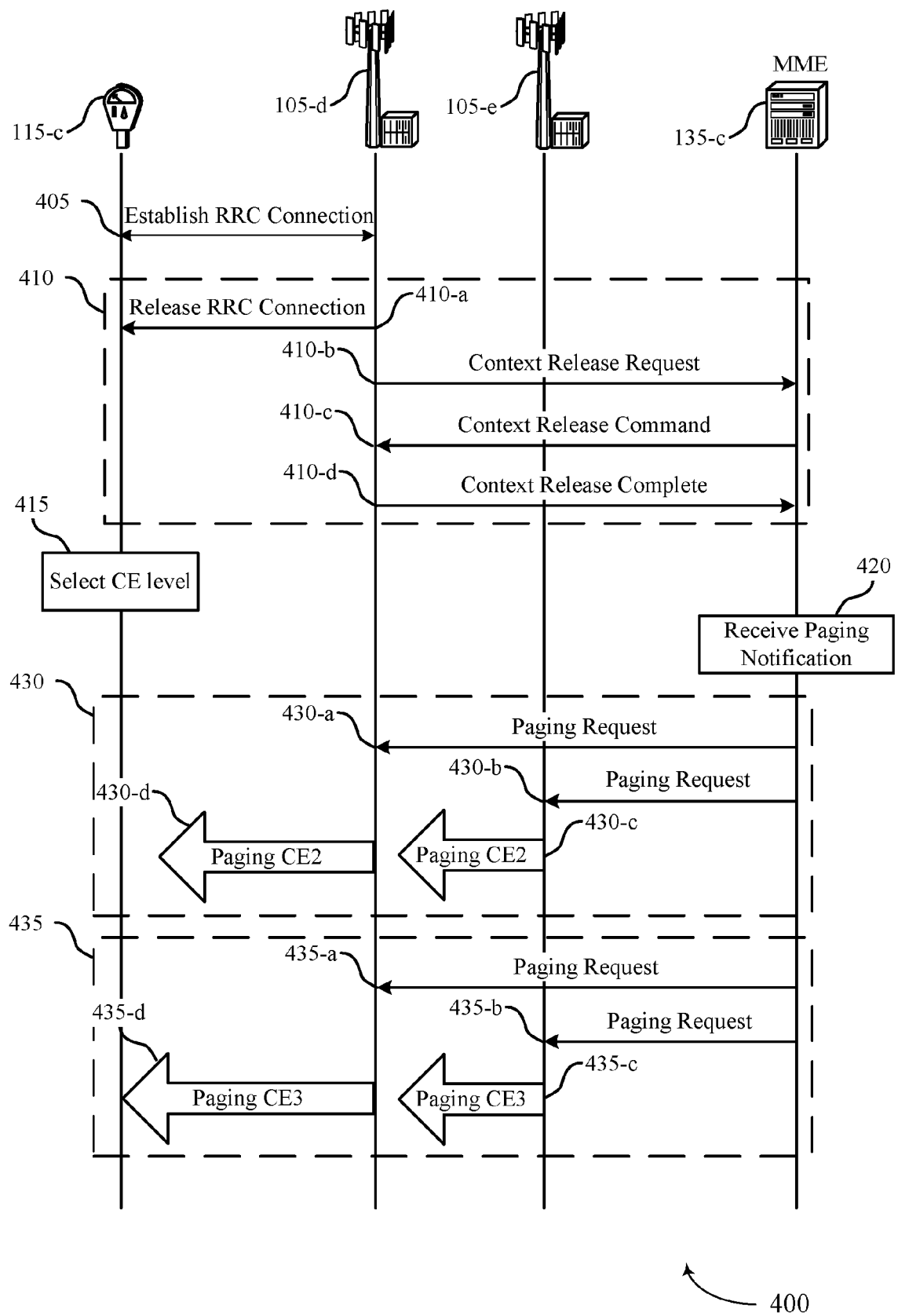

FIG. 4 illustrates an example of a process flow 400 in a system that supports low cost paging in accordance with various aspects of the present disclosure. Process flow 400 may include operations performed by UE 115-*c*, base station 105-*d*, base station 105-*e*, and MME 135-*c*, which may be examples of a UE 115, base stations 105, and an MME 135-*c* which may be examples of corresponding devices described above with reference to FIGS. 1-2. In some examples, UE 115-*c* may establish a connection based on a first CE level with base station 105-*d*, and upon entering an idle state the first CE level may be stored at MME 135-*c*. UE 115-*c* may continue to monitor channel conditions, and may select a second CE level without indicating the change in CE level to the network (e.g., base station 105-*d*, base station 105-*e*, or MME 135-*c*). MME 135-*c* may receive a paging notification for UE 115-*c* and may send a paging request, including the first CE level and dynamic CE level indicator, to base station 105-*d* and neighboring base station 105-*e*. Base station 105-*d* and base station 105-*e* may both be located in the same tracking area and may both blindly transmit multiple paging messages to UE 115-*c* at different CE levels until a response is received.

At step 405, UE 115-*c* and base station 105-*d* may establish an RRC connection. Establishing the RRC connection may include sending context information (e.g., device ID, UE-capabilities, CE level, dynamic CE indication, etc.) for UE 115-*c* to MME 135-*c*, where the information may be stored. In some cases, the information may be stored upon establishing the connection, but in some cases, the information is stored upon connection release. The stored information may be transparent to MME 135-*c*. In some cases, the base station 105-*d* may send an additional message to MME 135-*c* notifying MME 135-*c* that the UE 115-*c* is enabled for dynamic CE level adjustment. In other cases, UE 115-*c* may directly notify MME 135-*c* via the non-access stratum (NAS).

Establishing a dynamic CE configuration may include indicating support for dynamic CE paging. In some examples, the support is indicated to MME 135-*c* via NAS signaling. In other examples, the support is indicated to a base station. In some examples, the support indication is based on a user configuration, an operator configuration, or both. The operator configuration may be enabled via an indication of dynamic CE level enabled in a universal subscriber identity module (USIM), via an Open Mobile Alliance Device Management (OMA DM) indication, or both.

At step 410, the network may perform an RRC release procedure. In some cases, the release procedure may occur if UE 115-*c* enters into an idle mode. The RRC release procedure may include releasing the RRC connection 410-*a* between UE 115-*c* and base station 105-*d*, sending a context release request 410-*b* from base station 105-*d* to MME 135-*c*, sending a context release command 410-*c* from MME 135-*c* to base station 105-*d*, and responding to MME 135-*c* indicating that the context release is complete 410-*d*.

At step 415, UE 115-*c* may determine a CE level based on monitoring channel conditions. Determining the CE level may include performing channel measurements to determine whether a higher CE level may be used. For example, if UE 115-*c* determines that the channel measurements cross a threshold level the device may select a new CE level. For instance, UE 115-*c* may change the CE level from the first CE level (e.g., 5 dB CE) to the second CE level (e.g., 10 dB CE). In some cases, the second CE level selected by UE 115-*c* may not be advertised to the network, such as to base stations 105-*b* and 105-*c* and MME 135-*c*.

In some cases, UE 115-*c* may select a new CE level based on determining that a CE configuration timer has expired. The second CE level may be selected based on a limitation that the second CE level is higher than the first CE level.

At step 420, MME 135-*c* may receive a paging notification for UE 115-*c*. A paging notification may include receiving a downlink data notification message from the S-GW directing the MME 135-*c* to page the desired UE 115-*c*.

At step 430, MME 135-*c* may send paging requests 430-*a* and 430-*b* to each base station, such as base stations 105-*d* and 105-*e*, in the last known tracking area. In one example, the paging requests 430-*a* and 430-*b* may include information associated with the last known CE level and an adjustment index of zero (i.e., an indication not to adjust the CE level). Base stations 105-*d* and 105-*e* may transmit paging messages 430-*c* and 430-*d* at the last known CE level based on the received paging request and the adjustment index. Base stations 105-*d* and 105-*e* may wait for a response from UE 115-*c* acknowledging the paging message. However, since base station 105-*d* and 105-*e* are transmitting the paging message based on the first CE level and not the second CE level, UE 115-*c* may fail to receive the page.

According to process flow 400, MME 135-*c* may determine the paging strategy if no response is received form UE 115-*c*. MME 135-*c* may re-send the paging requests 430-*a* and 430-*b* N times using the same adjustment index. Retransmitting the paging requests may mitigate a scenario in which UE 115-*c* misses the paging message.

At step 435, MME 135-*c* may increment the adjustment index and may send a second set of paging requests 435-*a* and 435-*b* to base station 105-*d* and 105-*e*. Base stations 105-*d* and 105-*e* may transmit paging messages 435-*c* and 435-*d* at a second CE level based on the adjustment index. In some cases, base stations 105-*d* and 105-*e* may increment the CE level and may transmit a single paging messages according to a second level. In other case, base stations 105-*d* and 105-*e* may increment the CE level and transmit multiple paging messages according to the first level and the second level. MME 135-*c* may re-send the paging request 435-*c* and 435-*d* N times.

Figure 5:
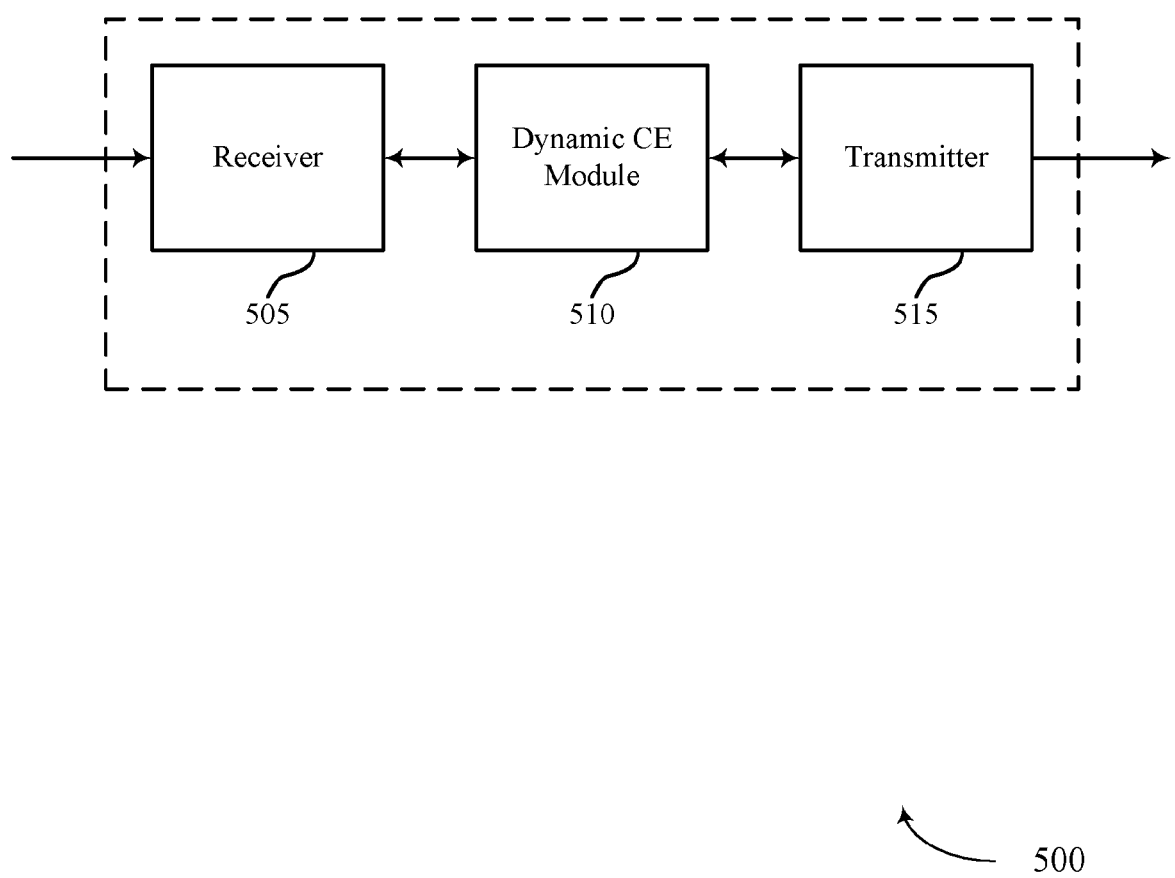
FIGS. 5-7 show block diagrams of a wireless device or devices that support low cost paging in accordance with various aspects of the present disclosure.

FIG. 5 shows a block diagram of a wireless device 500 configured for low cost paging in accordance with various aspects of the present disclosure. Wireless device 500 may be an example of aspects of a UE 115 described with reference to FIGS. 1-4. Wireless device 500 may include a receiver 505, a dynamic CE module 510, or a transmitter 515. Wireless device 500 may also include a processor. Each of these components may be in communication with each other.

The receiver 505 may receive information such as packets, user data, or control information associated with various information channels (e.g., control channels, data channels, and information related to low cost paging, etc.). Information may be passed on to the dynamic CE module 510, and to other components of wireless device 500.

The dynamic CE module 510 may establish a dynamic CE configuration with a network entity, communicate in a connected mode utilizing a first CE level of the dynamic CE configuration, select a second CE level of the dynamic CE configuration while in an idle mode, and receive a paging indication transmitted utilizing the second CE level while in the idle mode.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
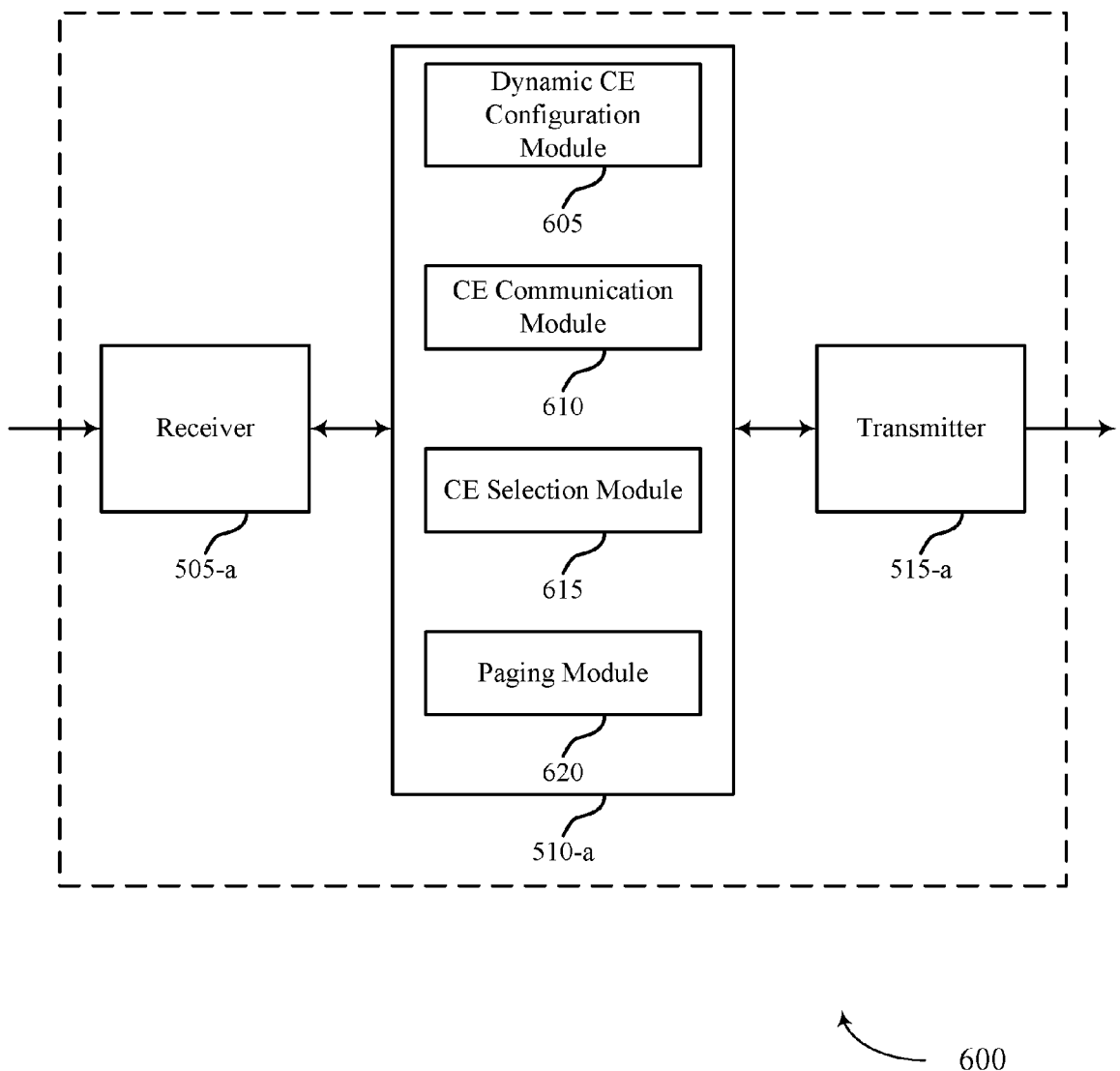

FIG. 6 shows a block diagram of a wireless device 600 for low cost paging in accordance with various aspects of the present disclosure. Wireless device 600 may be an example of aspects of a wireless device 500 or a UE 115 described with reference to FIGS. 1-5. Wireless device 600 may include a receiver 505-*a*, a dynamic CE module 510-*a*, or a transmitter 515-*a*. Wireless device 600 may also include a processor. Each of these components may be in communication with each other. The dynamic CE module 510-*a* may also include a dynamic CE configuration module 605, a CE communication module 610, a CE selection module 615, and a paging module 620.

The receiver 505-*a* may receive information which may be passed on to dynamic CE module 510-*a*, and to other components of wireless device 600. The dynamic CE module 510-*a* may perform the operations described with reference to FIG. 5. The transmitter 515-*a* may transmit signals received from other components of wireless device 600.

The dynamic CE configuration module 605 may establish a dynamic CE configuration with a network entity as described with reference to FIGS. 2-4. In some examples, identifying the dynamic CE configuration includes receiving NAS signaling from the wireless device. The dynamic CE configuration module 605 may also transmit an RRC configuration message to the wireless device, which may include the dynamic CE configuration. The dynamic CE configuration module 605 may also configure the wireless device 600 with a CE configuration timer.

The CE communication module 610 may communicate in a connected mode utilizing a first CE level of the dynamic CE configuration as described with reference to FIGS. 2-4.

The CE communication module 610 may also communicate in the connected mode utilizing the second CE level based on the paging indication.

The CE selection module 615 may select a second CE level of the dynamic CE configuration while in an idle mode as described with reference to FIGS. 2-4. The CE selection module 615 may also refrain from signaling an indication that the second CE level has been selected based on the dynamic CE configuration. In some examples, the second CE level may be selected based on a limitation that the second CE level may be higher than the first CE level. In some examples, the second CE level may be based on a limitation that the second CE level may be higher than the first CE level.

The paging module 620 may receive a paging indication transmitted utilizing the second CE level while in the idle mode as described with reference to FIGS. 2-4. The paging module 620 may also determine that the wireless device has not responded to the first paging message. The paging module 620 may, in some cases, transmit a third paging message for the wireless device according to the first CE level based on the determination. The third paging message may be transmitted simultaneously with the second paging message. In some examples, transmitting the first paging message or the second paging message includes sending a paging request to a set of base stations in a tracking area. The paging module 620 may also transmit a stop paging request based on the message from the wireless device. The paging module 620 may also retransmit the first paging message a threshold number of times, and transmitting the second paging message may be based on retransmitting the first paging message the threshold number of times. The paging module 620 may also receive a paging request from a core network entity, and transmitting the first paging message or transmitting the second paging message may be based on the paging request.

Figure 7:
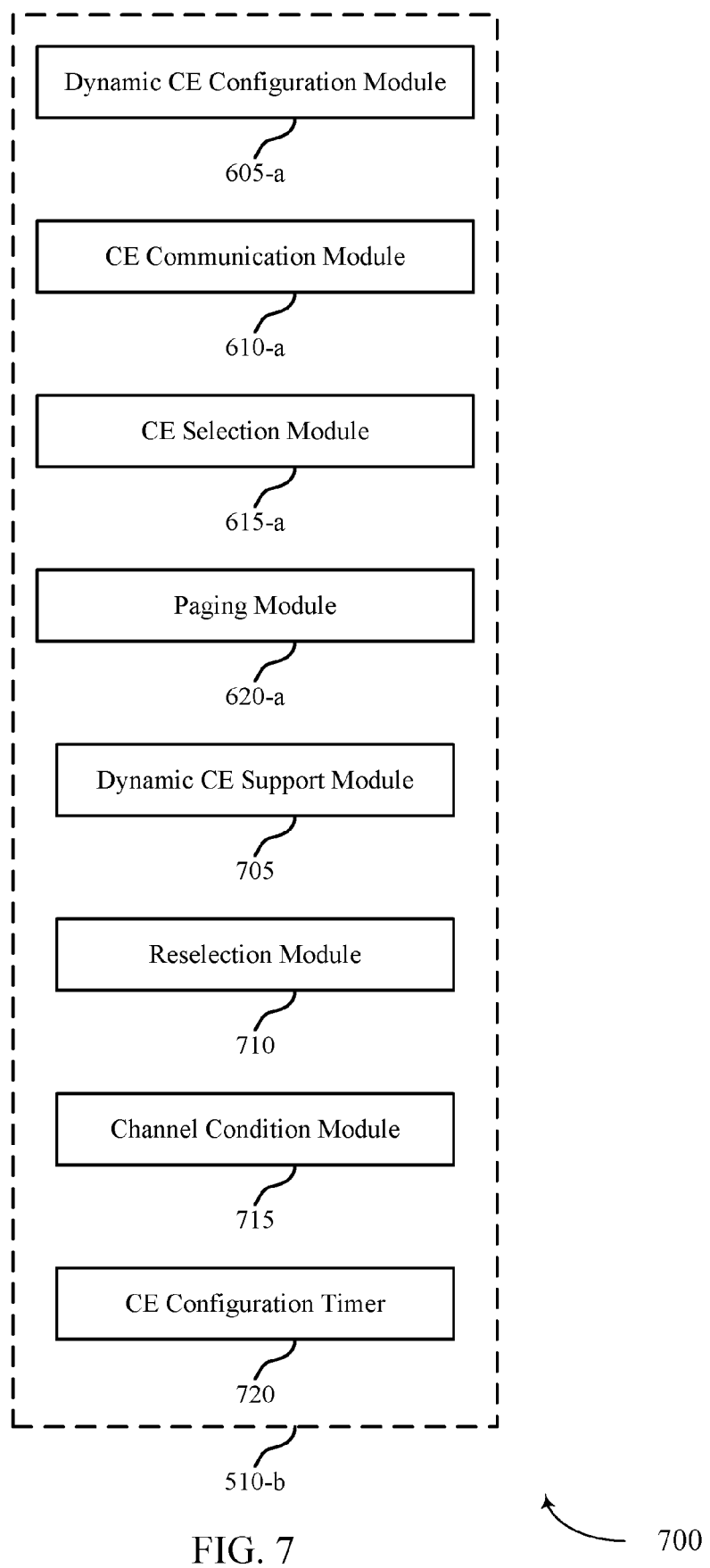

FIG. 7 shows a block diagram 700 of a dynamic CE module 510-*b* which may be a component of a wireless device 500 or a wireless device 600 for low cost paging in accordance with various aspects of the present disclosure. The dynamic CE module 510-*b* may be an example of aspects of a dynamic CE module 510 described with reference to FIGS. 5-6. The dynamic CE module 510-*b* may include a dynamic CE configuration module 605-*a*, a CE communication module 610-*a*, a CE selection module 615-*a*, and a paging module 620-*a*. Each of these modules may perform the functions described with reference to FIG. 6. The dynamic CE module 510-*b* may also include a dynamic CE support module 705, a reselection module 710, a channel condition module 715, and a CE configuration timer 720.

The dynamic CE support module 705 may be configured to include indicate support for dynamic CE paging in order to establish a dynamic CE configuration with a network entity as described with reference to FIGS. 2-4. In some examples, the support may be indicated to an MME via NAS signaling. The support may be indicated to a base station. In some examples, the support indication may be based on a user configuration, an operator configuration, or both. The operator configuration may be enabled via an indication of dynamic CE level enabled in a universal subscriber identity module (USIM), via an Open Mobile Alliance Device Management (OMA DM) indication, or both. The dynamic CE support module 705 may also determine that a base station supports the dynamic CE configuration based on the dynamic CE support indication. The dynamic CE support module 705 may also determine that a base station does not support the dynamic CE configuration based on the dynamic CE support indication. In some examples, the indication of support for dynamic CE level depends in part on configuration, where the configuration includes a user configuration or an operator configuration, and the operator configuration may include an indication of dynamic CE level enabled in the USIM and indication via OMA DM. The dynamic CE support module 705 may also transmit a dynamic CE support indication to a base station serving the wireless device. The dynamic CE support module 705 may also receive a dynamic CE support indication from a core network entity. The dynamic CE support module 705 may also receive a dynamic CE value from a core network entity.

The reselection module 710 may reselect a base station while in the idle mode based on the determination as described with reference to FIGS. 2-4. The reselection module 710 may also refrain from reselecting the base station while in the idle mode based on the determination.

The channel condition module 715 may measure a channel condition, and selecting the second CE level may be based on the channel condition as described with reference to FIGS. 2-4.

The CE configuration timer 720 may determine that a CE configuration timer has expired; and selecting the second CE level may be based on the expiration of the CE configuration timer as described with reference to FIGS. 2-4.

Figure 8:
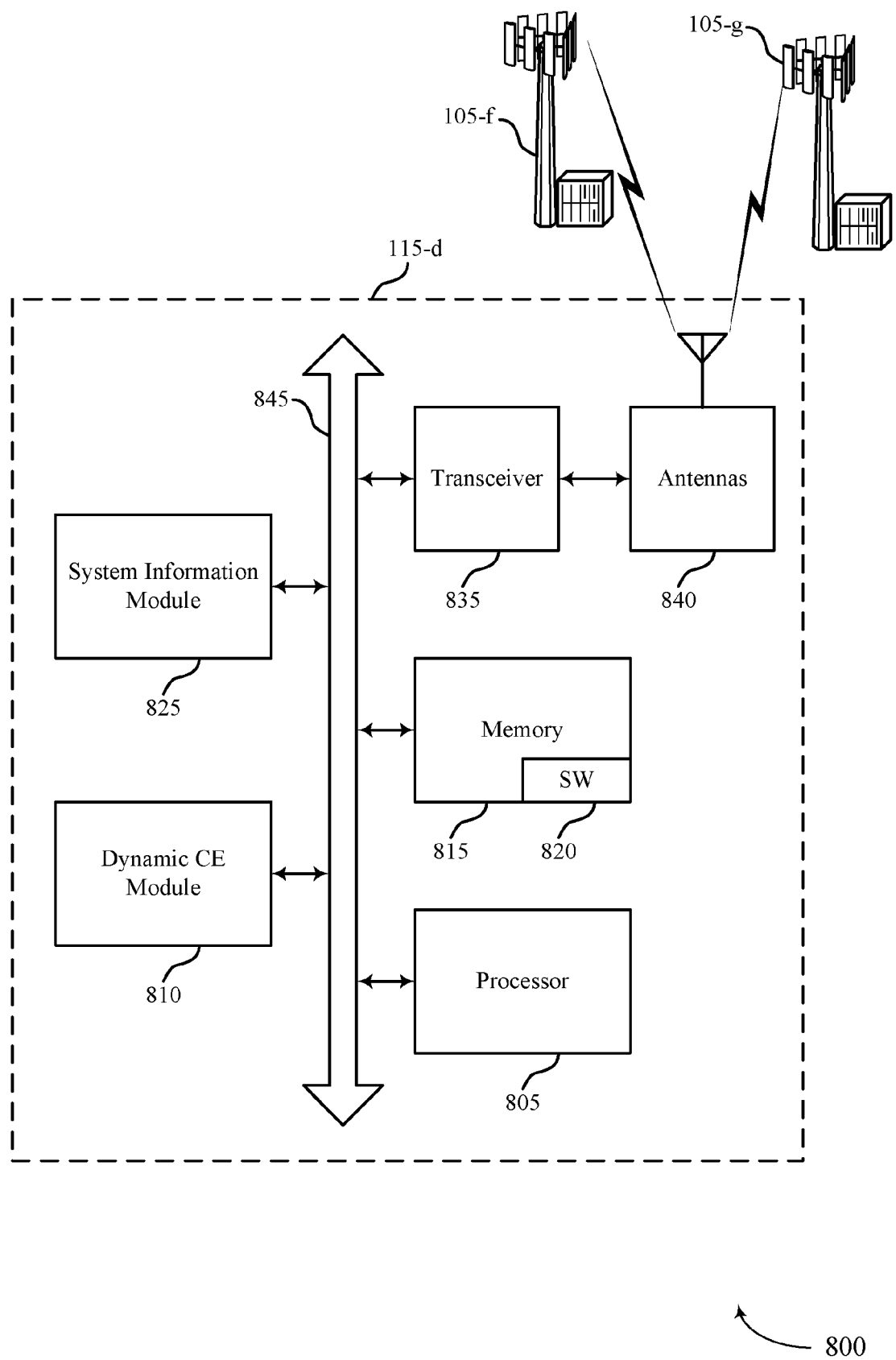
FIG. 8 illustrates a block diagram of a system including a user equipment (UE) that supports low cost paging in accordance with various aspects of the present disclosure.

FIG. 8 shows a diagram of a system 800 including a UE 115 configured for low cost paging in accordance with various aspects of the present disclosure. System 800 may include UE 115-*d*, which may be an example of a wireless device 500, a wireless device 600, or a UE 115 described with reference to FIGS. 1, 2 and 5-7. UE 115-*d* may include a dynamic CE module 810, which may be an example of a dynamic CE module 510 described with reference to FIGS. 5-7. UE 115-*d* may also include a system information module 825. UE 115-*d* may also include components for bi-directional voice and data communications including components for transmitting communications and components for receiving communications. For example, UE 115-*d* may communicate bi-directionally with base station 105-*f* or base station 105-*g*.

The system information module 825 may monitor system information for an indication of dynamic CE support in order to select a CE level or cell as described with reference to FIGS. 2-4.

UE 115-*d* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*d* may include a single antenna 840, UE 115-*d* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., low cost paging, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.)

Figure 9:
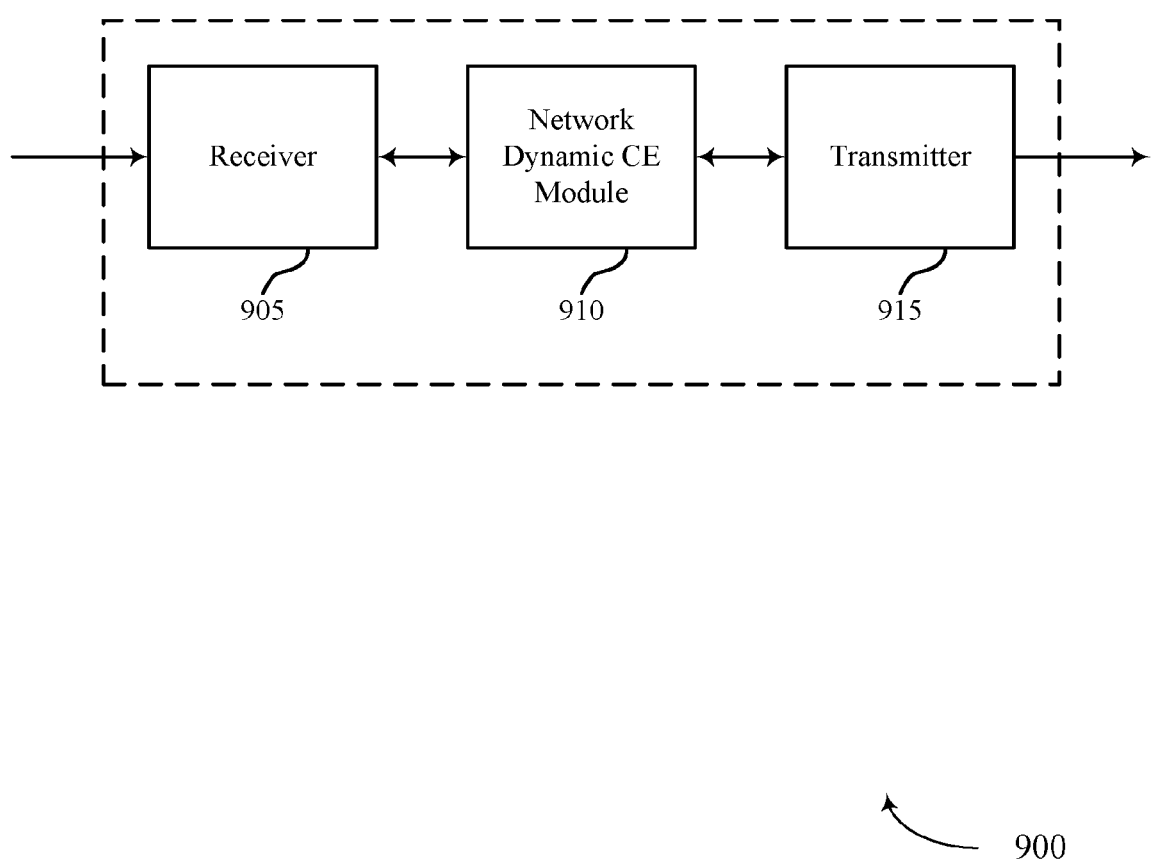
FIGS. 9-11 show block diagrams of a network entity or entities that support low cost paging in accordance with various aspects of the present disclosure.

FIG. 9 shows a block diagram of a network entity 900 configured for low cost paging in accordance with various aspects of the present disclosure. Network entity 900 may be an example of aspects of a base station 105 or an MME 135 described with reference to FIGS. 1-8. Network entity 900 may include a receiver 905, a network dynamic CE module 910, or a transmitter 915. Network entity 900 may also include a processor. Each of these components may be in communication with each other.

The receiver 905 may receive information such as packets, user data, or control information associated with various information channels (e.g., control channels, data channels, and information related to low cost paging, etc.). Information may be passed on to the network dynamic CE module 910, and to other components of network entity 900. In some examples, the receiver 905 may receive a message from the wireless device.

The network dynamic CE module 910 may identify a dynamic CE configuration for a wireless device, transmit a first paging message for the wireless device according to a first CE level of the dynamic CE configuration, determine that the wireless device has not responded to the first paging message, and transmit a second paging message for the wireless device according to a second CE level of the dynamic CE configuration based on the determination.

The transmitter 915 may transmit signals received from other components of network entity 900. In some examples, the transmitter 915 may be collocated with the receiver 905 in a transceiver module. The transmitter 915 may include a single antenna, or it may include a plurality of antennas.

Figure 10:
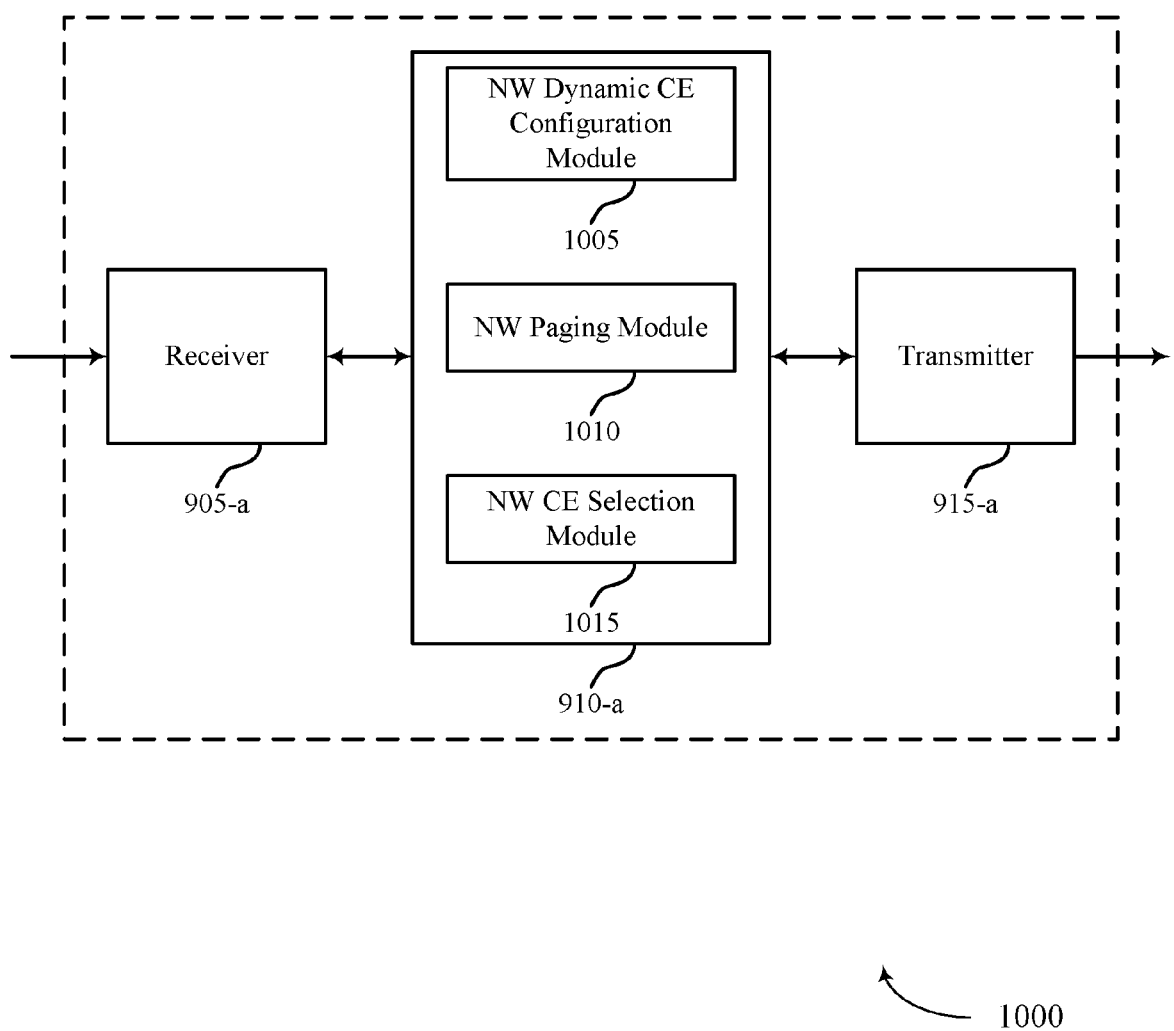

FIG. 10 shows a block diagram of a network entity 1000 for low cost paging in accordance with various aspects of the present disclosure. Network entity 1000 may be an example of aspects of a network entity 900 or a base station 105 or MME 135 described with reference to FIGS. 1-9. Network entity 1000 may include a receiver 905-*a*, a network dynamic CE module 910-*a*, or a transmitter 915-*a*. Network entity 1000 may also include a processor. Each of these components may be in communication with each other. The network dynamic CE module 910-*a* may also include a NW dynamic CE configuration module 1005, a NW paging module 1010, and a NW CE selection module 1015.

The receiver 905-*a* may receive information which may be passed on to network dynamic CE module 910-*a*, and to other components of network entity 1000. The network dynamic CE module 910-*a* may perform the operations described with reference to FIG. 9. The transmitter 915-*a* may transmit signals received from other components of network entity 1000.

The NW dynamic CE configuration module 1005 may identify a dynamic CE configuration for a wireless device as described with reference to FIGS. 2-4.

The NW paging module 1010 may transmit a first paging message for the wireless device according to a first CE level of the dynamic CE configuration as described with reference to FIGS. 2-4.

The NW CE selection module 1015 may transmit a second paging message for the wireless device according to a second CE level of the dynamic CE configuration based on the determination as described with reference to FIGS. 2-4.

Figure 11:
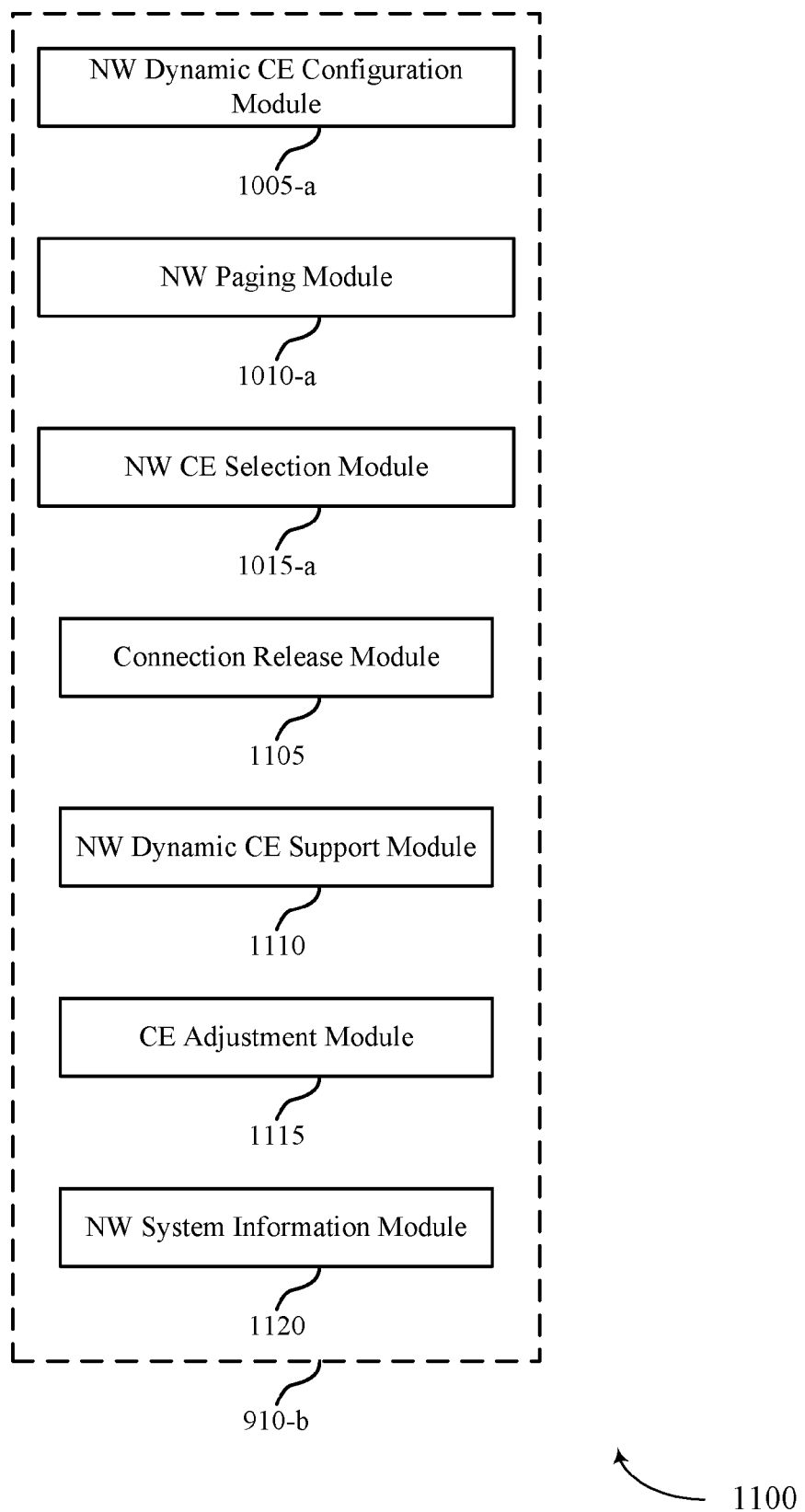

FIG. 11 shows a block diagram 1100 of a network dynamic CE module 910-*b* which may be a component of a network entity 900 or a network entity 1000 for low cost paging in accordance with various aspects of the present disclosure. The network dynamic CE module 910-*b* may be an example of aspects of a network dynamic CE module 910 described with reference to FIGS. 9-10. The network dynamic CE module 910-*b* may include a NW dynamic CE configuration module 1005-*a*, a NW paging module 1010-*a*, and a NW CE selection module 1015-*a*. Each of these modules may perform the functions described with reference to FIG. 10. The network dynamic CE module 910-*b* may also include a connection release module 1105, a NW dynamic CE support module 1110, a CE adjustment module 1115, and a NW system information module 1120.

The connection release module 1105 may determine that the wireless device is in an idle mode as described with reference to FIGS. 2-4. In some examples, identifying the dynamic CE configuration receiving a context release complete message from a base station comprising paging information, dynamic CE configuration information, or both. The connection release module 1105 may also transmit a context release complete message to a core network entity comprising paging information, dynamic CE configuration information, or both.

The NW dynamic CE support module 1110 may transmit a dynamic CE support indication to the wireless device as described with reference to FIGS. 2-4.

The CE adjustment module 1115 may be configured such that transmitting the second paging message may include indicating a CE level adjustment index indicating whether to use the first CE level, the second CE level, another CE level, or any combination thereof as described with reference to FIGS. 2-4. The CE adjustment module 1115 may be configured such that transmitting the second paging message may include transmitting a number of retransmissions of the first paging message indicating whether to use the first CE level, the second CE level, another CE level, or any combination thereof as described with reference to FIGS. 2-4. In some examples, transmitting a number of retransmissions of the first paging message may include transmitting at least one retransmission of the first paging message. The CE adjustment module 1115 may also receive a CE level adjustment index from a core network entity, and the second CE level may be based on the adjustment index.

The NW system information module 1120 may broadcast a dynamic CE support indication as described with reference to FIGS. 2-4.

Figure 12A:
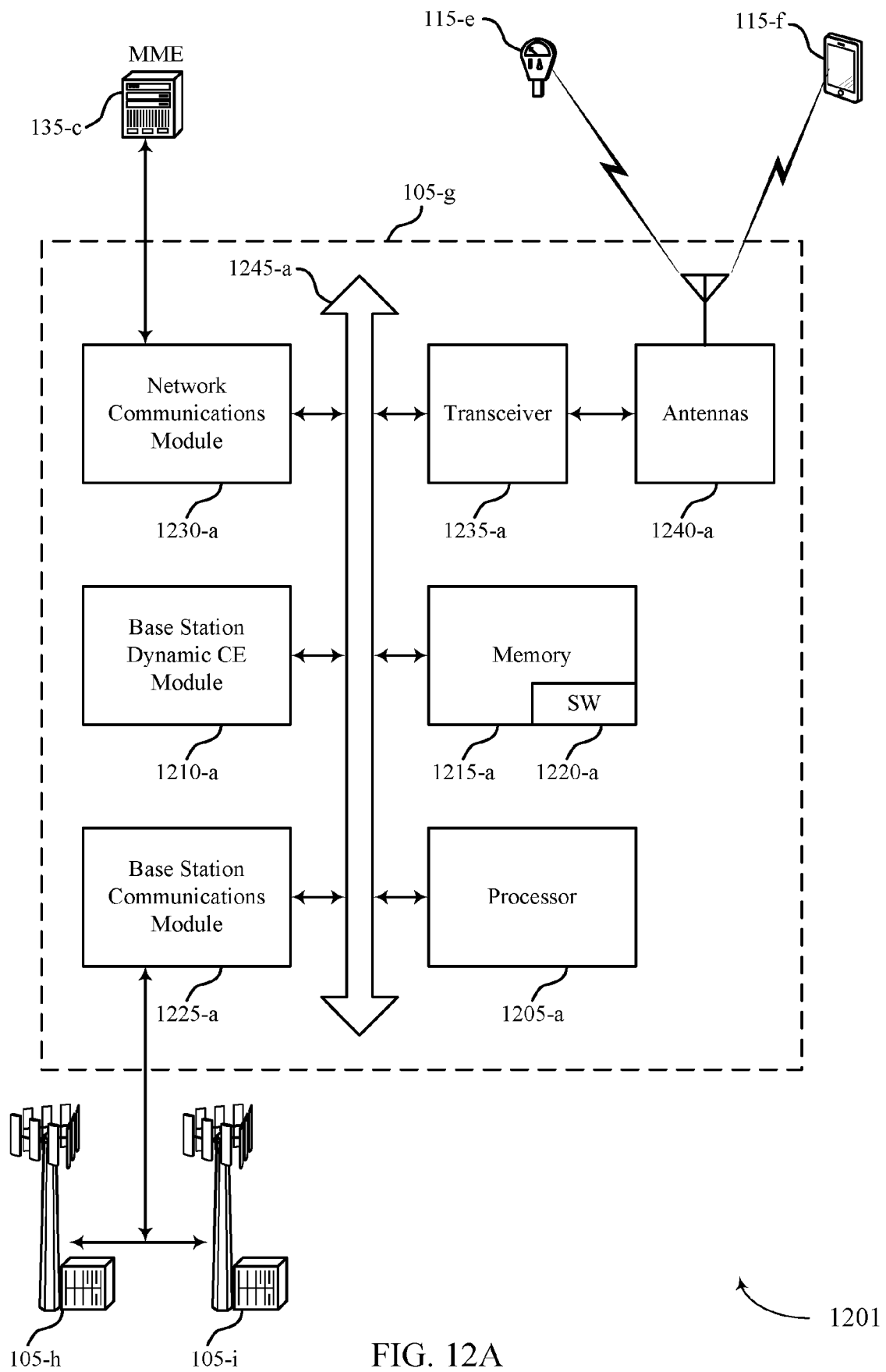
FIG. 12A illustrates a block diagram of a system including a base station that supports low cost paging in accordance with various aspects of the present disclosure.

FIG. 12A shows a diagram of a system 1201 including a base station 105 configured for low cost paging in accordance with various aspects of the present disclosure. System 1201 may include base station 105-*g*, which may be an example of a network entity 900, a network entity 1000, or a base station 105 described with reference to FIGS. 1, 2 and 9-11. Base Station 105-*g* may include a network dynamic CE module 1210-*a*, which may be an example of a network dynamic CE module 910 described with reference to FIGS. 9-11. Base Station 105-*g* may also include components for bi-directional voice and data communications including components for transmitting communications and components for receiving communications. For example, base station 105-*g* may communicate bi-directionally with UE 115-*e* or UE 115-*f*.

In some cases, base station 105-*g* may have one or more wired backhaul links. Base station 105-*g* may have a wired backhaul link (e.g., S1 interface, etc.) to the core network. Base station 105-*g* may also communicate with other base stations 105, such as base station 105-*h* and base station 105-*i* via inter-base station backhaul links (e.g., an X2 interface). Each of the base stations 105 may communicate with UEs 115 using the same or different wireless communications technologies. In some cases, base station 105-*g* may communicate with other base stations such as 105-*h* or 105-*i* utilizing base station communication module 1225-*a*. In some examples, base station communication module 1225 may provide an X2 interface within an LTE/LTE-a wireless communication network technology to provide communication between some of the base stations 105. In some examples, base station 105-*g* may communicate with other base stations through core network. In some cases, base station 105-*g* may communicate with the entities of the core network such as MME 135-*c* through network communications module 1230. For example, base station 105-*g* may coordinate dynamic CE configuration for a UE 115 with MME 135-*c*.

The base station 105-*g* may include a processor 1205-*a*, memory 1215-*a* (including software (SW) 1220-*a*), transceiver 1235-*a*, and antenna(s) 1240-*a*, which each may be in communication, directly or indirectly, with one another (e.g., over bus system 1245-*a*). The transceivers 1235-*a* may be configured to communicate bi-directionally, via the antenna(s) 1240-*a*, with the UEs 115, which may be multi-mode devices. The transceiver 1235-*a* (or other components of the base station 105-*g*) may also be configured to communicate bi-directionally, via the antennas 1240-*a*, with one or more other base stations (not shown). The transceiver 1235-*a* may include a modem configured to modulate the packets and provide the modulated packets to the antennas 1240-*a* for transmission, and to demodulate packets received from the antennas 1240-*a*. The base station 105-*g* may include multiple transceivers 1235-*a*, each with one or more associated antennas 1240-*a*. The transceiver may be an example of a combined receiver 905 and transmitter 915 of FIG. 9.

The memory 1215-*a* may include RAM and ROM. The memory 1215-*a* may also store computer-readable, computer-executable software code 1220-*a* containing instructions that are configured to, when executed, cause the processor 1205-*a* to perform various functions described herein (e.g., low cost paging, selecting coverage enhancement techniques, call processing, database management, message routing, etc.). Alternatively, the software 1220-*a* may not be directly executable by the processor 1205-*a* but be configured to cause the computer, e.g., when compiled and executed, to perform functions described herein. The processor 1205-*a* may include an intelligent hardware device, e.g., a CPU, a microcontroller, an ASIC, etc. The processor 1205-*a* may include various special purpose processors such as encoders, queue processing modules, base band processors, radio head controllers, digital signal processor (DSPs), and the like.

The base station communications module 1225-*a* may manage communications with other base stations 105. In some cases a communications management module may include a controller or scheduler for controlling communications with UEs 115 in cooperation with other base stations 105. For example, the base station communications module 1225-*a* may coordinate scheduling for transmissions to UEs 115 for various interference mitigation techniques such as beamforming or joint transmission.

Figure 12B:
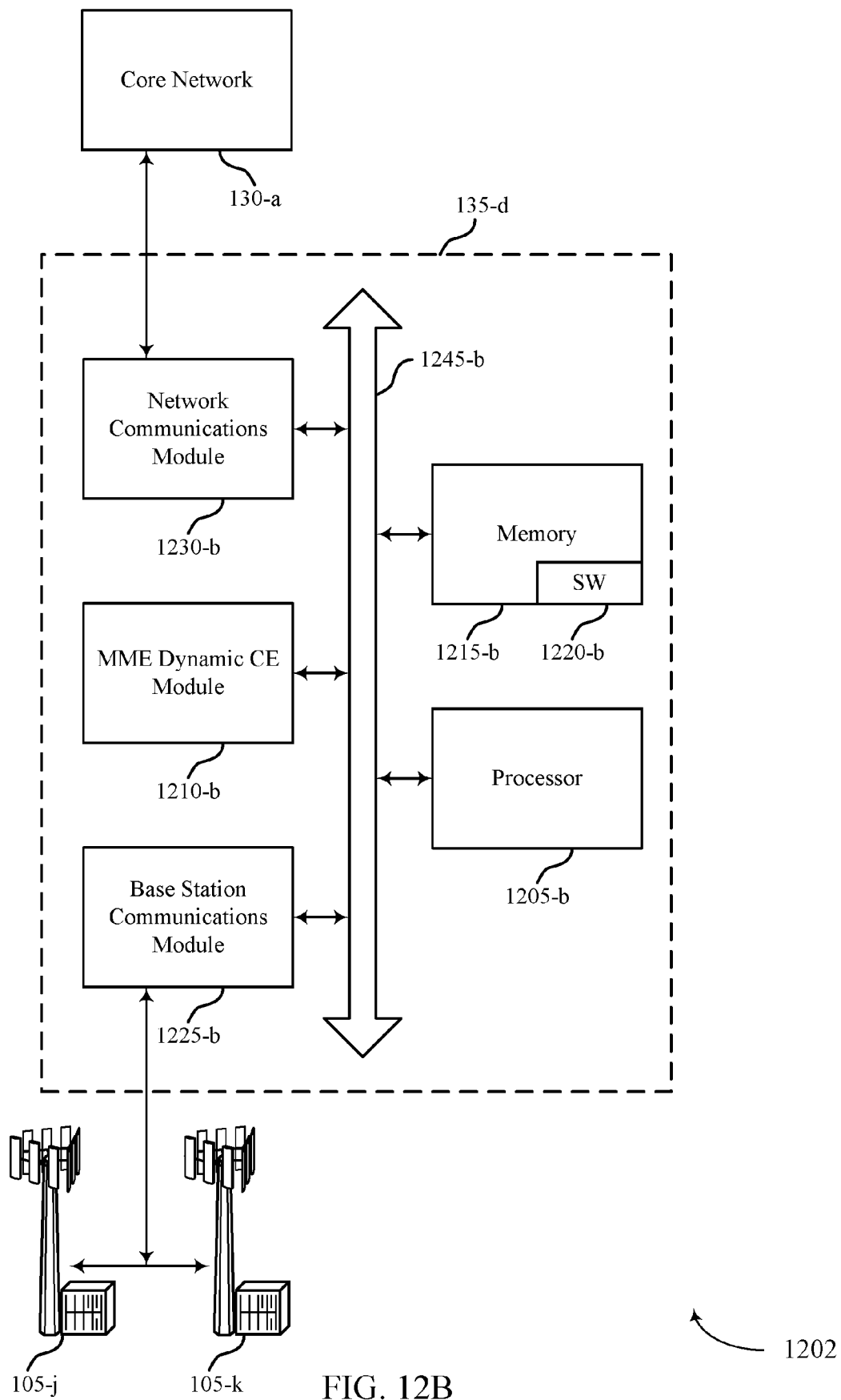
FIG. 12B illustrates a block diagram of a system including a mobility management entity (MME) that supports low cost paging in accordance with various aspects of the present disclosure.

FIG. 12B shows a diagram of a system 1201 including an MME 135-*d* configured for low cost paging in accordance with various aspects of the present disclosure. System 1202 may include MME 135-*d*, which may be an example of a network entity 900, a network entity 1000, or an MME 135 described with reference to FIGS. 1-4 and 9-11. MME 135-*d* may include a network dynamic CE module 1210-*b*, which may be an example of a network dynamic CE module 910 described with reference to FIGS. 9-11. MME 135-*d* may also include components for bi-directional communications including components for transmitting communications and components for receiving communications. For example, MME 135-*d* may communicate bi-directionally with base station 105-*j* or base station 105-*j*. MME 135-*d* may also communicate with UEs 115 (not shown) via the base station connections.

In some cases, MME 135-*d* may have one or more wired backhaul links. MME 135-*d* may have a wired backhaul link (e.g., S1 interface, etc.) to one or more base stations 105. Each of the base stations 105 may communicate with UEs 115 using the same or different wireless communications technologies. In some cases, MME 135-*d* may communicate with base stations such as 105-*j* or 105-*k* utilizing base station communication module 1225-*b*. In some examples, base station communication module 1225-*b* may provide an S1 interface within an LTE/LTE-a wireless communication network technology. In some examples, MME 135-*d* may communicate with other base stations through core network 130-*a*. In some cases, MME 135-*d* may communicate with the core network 130-*a* (e.g., with an S-GW, not shown) through network communications module 1230-*b*.

The MME 135-*d* may include a processor 1205-*b* and memory 1215-*b* (including software (SW) 1220-*b* which each may be in communication, directly or indirectly, with one another (e.g., over bus system 1245-*b*). The memory 1215-*b* may include RAM and ROM. The memory 1215-*b* may also store computer-readable, computer-executable software code 1220-*b* containing instructions that are configured to, when executed, cause the processor 1205-*b* to perform various functions described herein (e.g., low cost paging, selecting coverage enhancement techniques, call processing, database management, message routing, etc.). Alternatively, the software 1220-*b* may not be directly executable by the processor 1205-*b* but be configured to cause the computer, e.g., when compiled and executed, to perform functions described herein. The processor 1205-*b* may include an intelligent hardware device, e.g., a CPU, a microcontroller, an ASIC, etc. The processor 1205-*b* may include various special purpose processors such as encoders, queue processing modules, base band processors, radio head controllers, digital signal processor (DSPs), and the like.

The base station communications module 1225-*b* may manage communications with base stations 105. In some cases a communications management module may include a controller or scheduler for controlling communications with UEs 115 in cooperation with base stations 105. For example, the base station communications module 1225-*b* may coordinate scheduling for transmissions to UEs 115 for various interference mitigation techniques such as beamforming or joint transmission.

The components of wireless device 500, wireless device 600, dynamic CE module 510, system 700, network entity 900, network entity 1000, network dynamic CE module 910, system 1201 and system 1202 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 13:
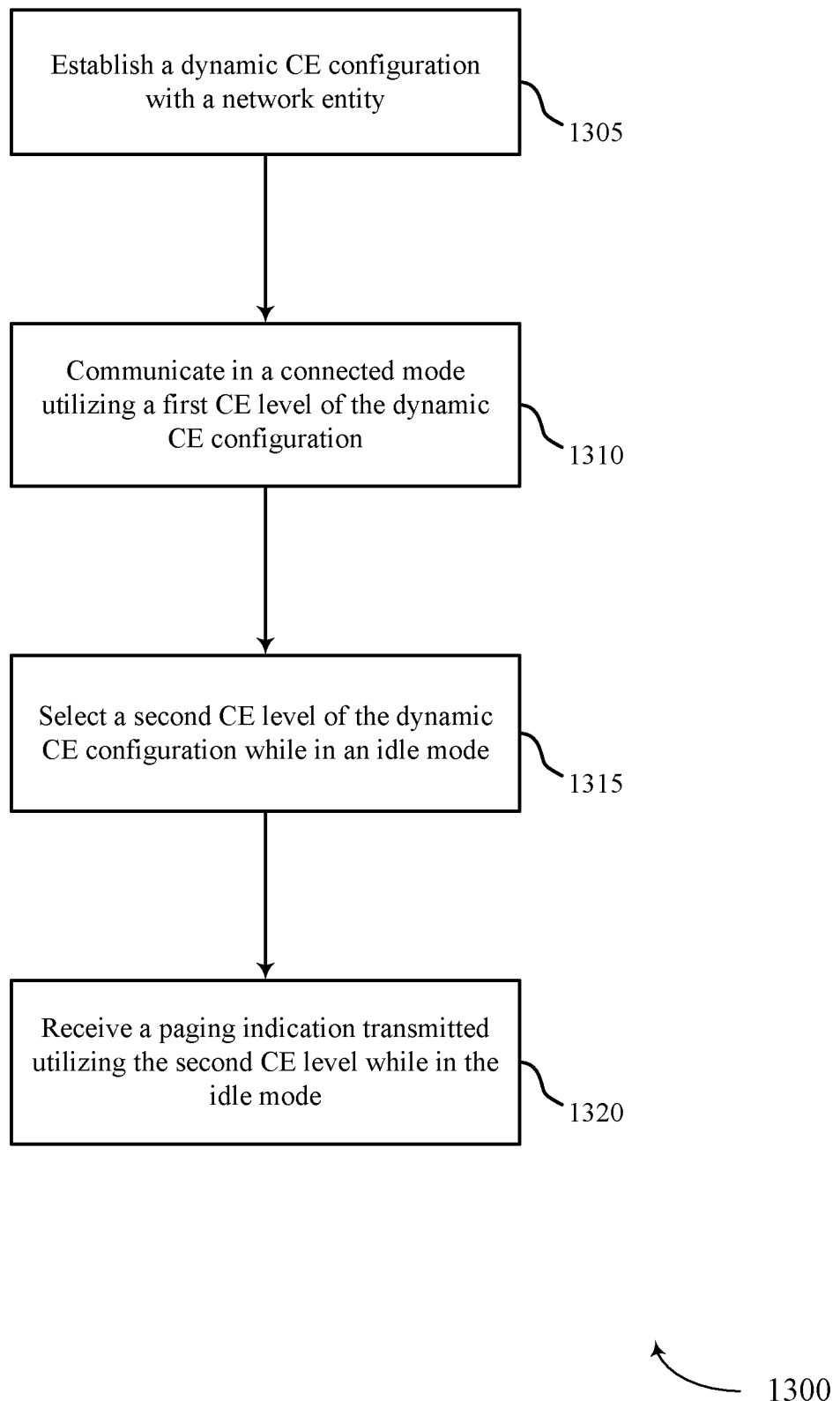
FIGS. 13-18 illustrate methods for low cost paging in accordance with various aspects of the present disclosure.

FIG. 13 shows a flowchart illustrating a method 1300 for low cost paging in accordance with various aspects of the present disclosure. The operations of method 1300 may be implemented by a UE 115 or its components as described with reference to FIGS. 1-12. For example, the operations of method 1300 may be performed by the dynamic CE module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may establish a dynamic CE configuration with a network entity as described with reference to FIGS. 2-4. In certain examples, the operations of block 1305 may be performed by the dynamic CE configuration module 605 as described with reference to FIG. 6.

At block 1310, the UE 115 may communicate in a connected mode utilizing a first CE level of the dynamic CE configuration as described with reference to FIGS. 2-4. In certain examples, the operations of block 1310 may be performed by the CE communication module 610 as described with reference to FIG. 6.

At block 1315, the UE 115 may select a second CE level of the dynamic CE configuration while in an idle mode as described with reference to FIGS. 2-4. In certain examples, the operations of block 1315 may be performed by the CE selection module 615 as described with reference to FIG. 6.

At block 1320, the UE 115 may receive a paging indication transmitted utilizing the second CE level while in the idle mode as described with reference to FIGS. 2-4. In certain examples, the operations of block 1320 may be performed by the paging module 620 as described with reference to FIG. 6.

Figure 14:
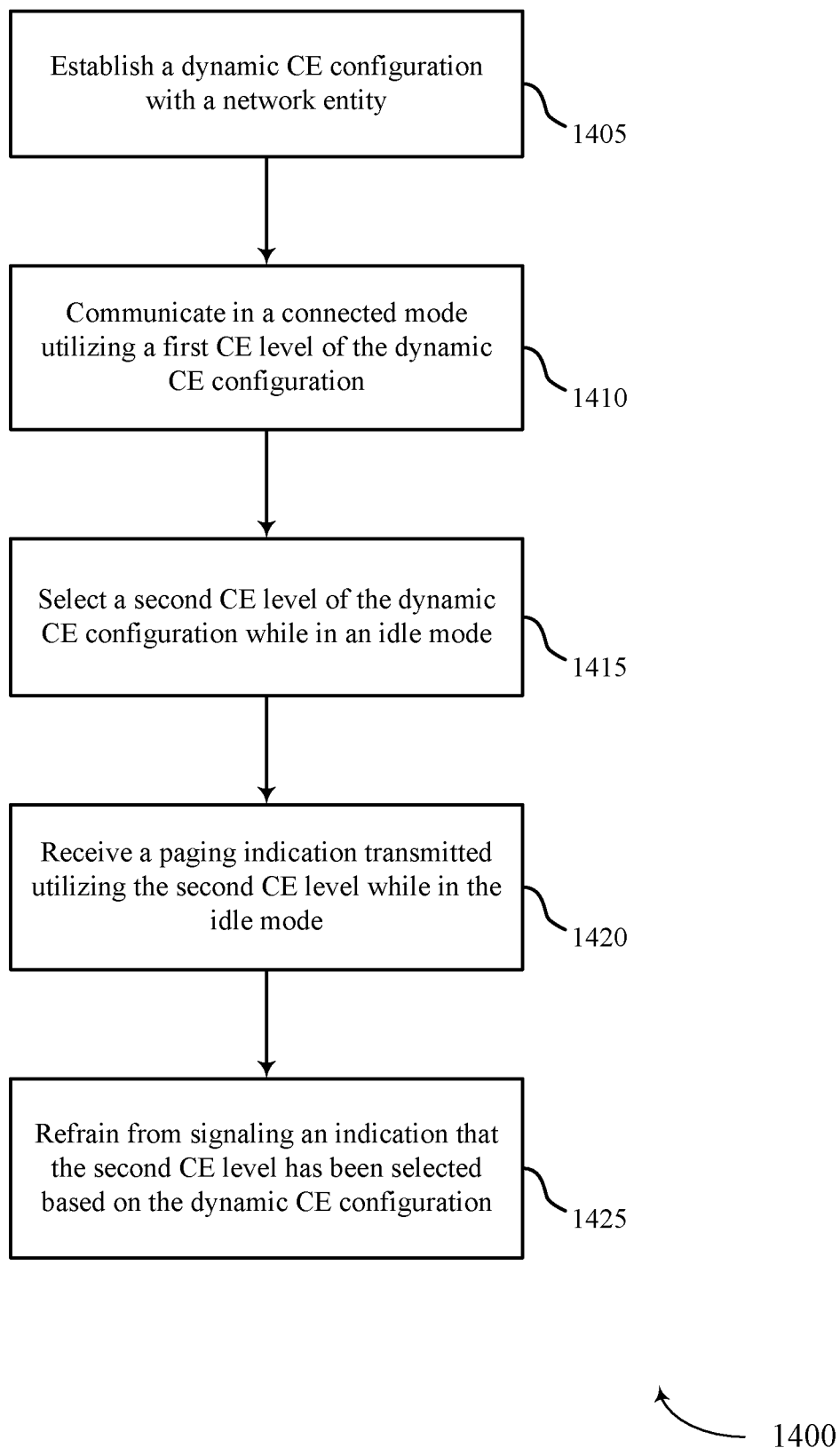

FIG. 14 shows a flowchart illustrating a method 1400 for low cost paging in accordance with various aspects of the present disclosure. The operations of method 1400 may be implemented by a UE 115 or its components as described with reference to FIGS. 1-12. For example, the operations of method 1400 may be performed by the dynamic CE module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, the UE 115 may establish a dynamic CE configuration with a network entity as described with reference to FIGS. 2-4. In certain examples, the operations of block 1405 may be performed by the dynamic CE configuration module 605 as described with reference to FIG. 6.

At block 1410, the UE 115 may communicate in a connected mode utilizing a first CE level of the dynamic CE configuration as described with reference to FIGS. 2-4. In certain examples, the operations of block 1410 may be performed by the CE communication module 610 as described with reference to FIG. 6.

At block 1415, the UE 115 may select a second CE level of the dynamic CE configuration while in an idle mode as described with reference to FIGS. 2-4. In certain examples, the operations of block 1415 may be performed by the CE selection module 615 as described with reference to FIG. 6.

At block 1420, the UE 115 may receive a paging indication transmitted utilizing the second CE level while in the idle mode as described with reference to FIGS. 2-4. In certain examples, the operations of block 1420 may be performed by the paging module 620 as described with reference to FIG. 6.

At block 1425, the UE 115 may refrain from signaling an indication that the second CE level has been selected based on the dynamic CE configuration as described with reference to FIGS. 2-4. In certain examples, the operations of block 1425 may be performed by the CE selection module 615 as described with reference to FIG. 6.

Figure 15:
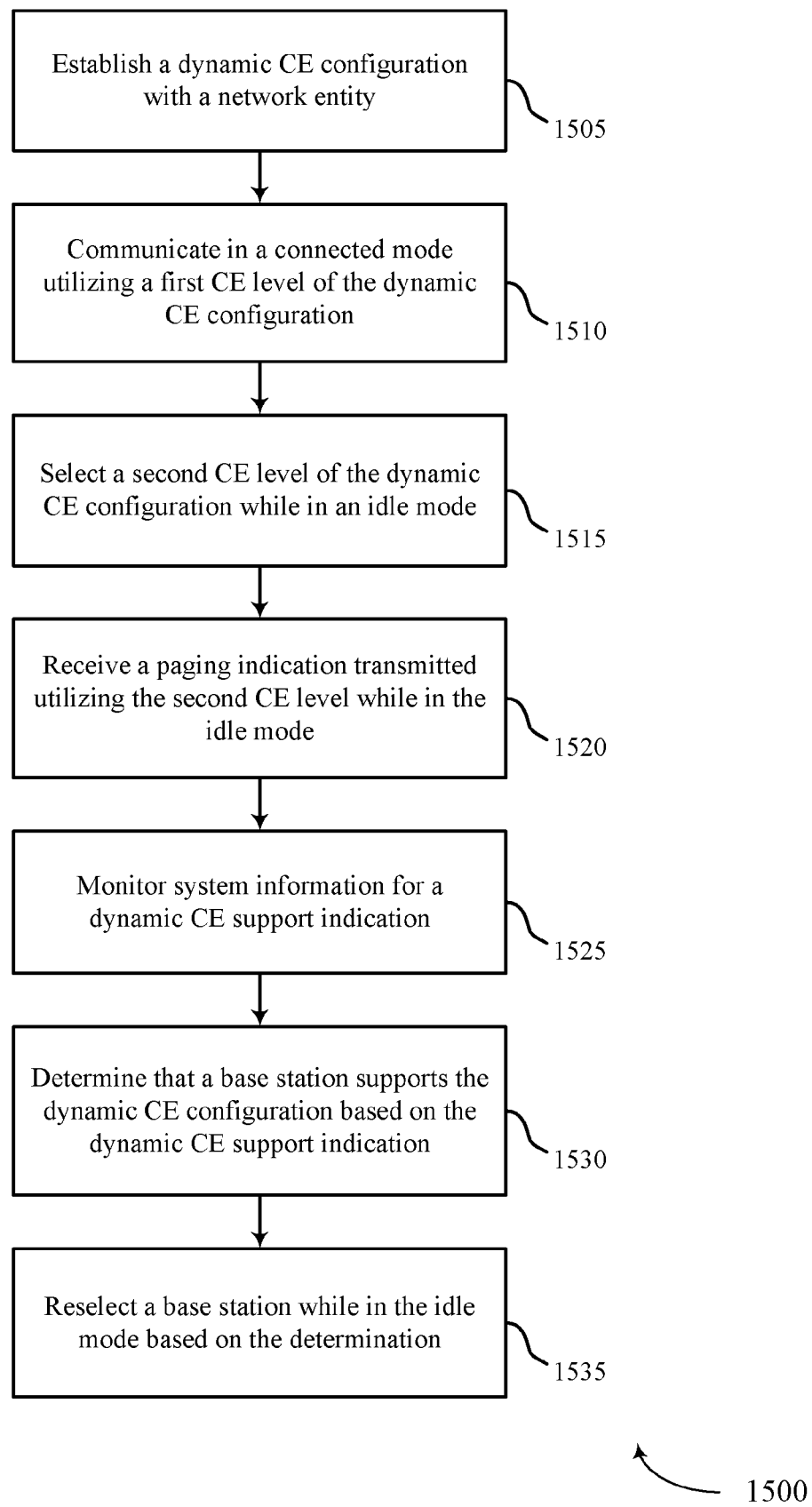

FIG. 15 shows a flowchart illustrating a method 1500 for low cost paging in accordance with various aspects of the present disclosure. The operations of method 1500 may be implemented by a UE 115 or its components as described with reference to FIGS. 1-12. For example, the operations of method 1500 may be performed by the dynamic CE module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIGS. 13-14.

At block 1505, the UE 115 may establish a dynamic CE configuration with a network entity as described with reference to FIGS. 2-4. In certain examples, the operations of block 1505 may be performed by the dynamic CE configuration module 605 as described with reference to FIG. 6.

At block 1510, the UE 115 may communicate in a connected mode utilizing a first CE level of the dynamic CE configuration as described with reference to FIGS. 2-4. In certain examples, the operations of block 1510 may be performed by the CE communication module 610 as described with reference to FIG. 6.

At block 1515, the UE 115 may select a second CE level of the dynamic CE configuration while in an idle mode as described with reference to FIGS. 2-4. In certain examples, the operations of block 1515 may be performed by the CE selection module 615 as described with reference to FIG. 6.

At block 1520, the UE 115 may receive a paging indication transmitted utilizing the second CE level while in the idle mode as described with reference to FIGS. 2-4. In certain examples, the operations of block 1520 may be performed by the paging module 620 as described with reference to FIG. 6.

At block 1525, the UE 115 may monitor system information for a dynamic CE support indication as described with reference to FIGS. 2-4. In certain examples, the operations of block 1525 may be performed by the system information module 825 as described with reference to FIG. 8.

At block 1530, the UE 115 may determine that a base station 105 supports the dynamic CE configuration based on the dynamic CE support indication as described with reference to FIGS. 2-4. In certain examples, the operations of block 1530 may be performed by the dynamic CE support module 705 as described with reference to FIG. 7.

At block 1535, the UE 115 may reselect a base station 105 while in the idle mode based on the determination as described with reference to FIGS. 2-4. In certain examples, the operations of block 1535 may be performed by the reselection module 710 as described with reference to FIG. 7.

Figure 16:
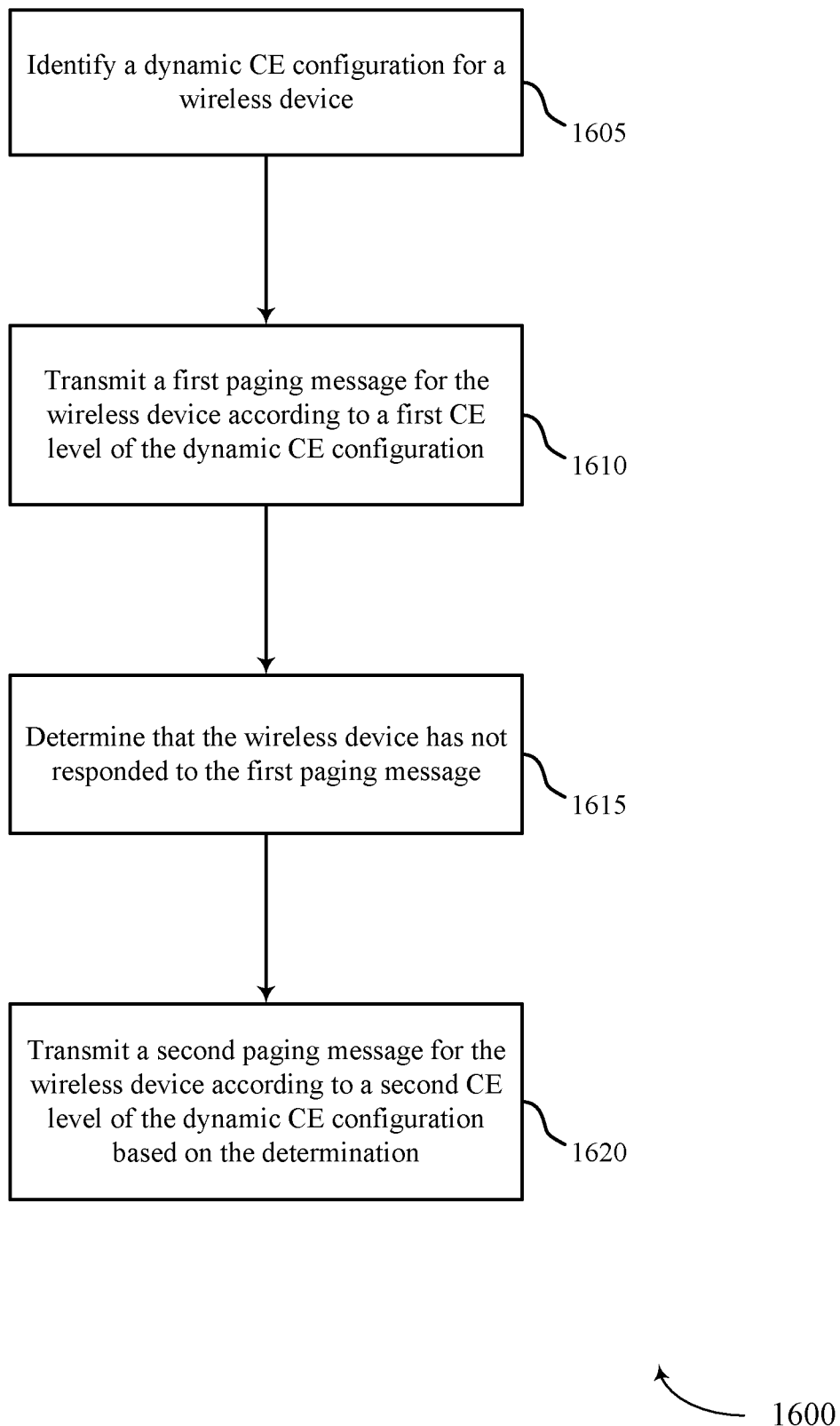

FIG. 16 shows a flowchart illustrating a method 1600 for low cost paging in accordance with various aspects of the present disclosure. The operations of method 1600 may be implemented by a network entity such as a base station 105, an MME 135 or its components as described with reference to FIGS. 1-12. For example, the operations of method 1600 may be performed by the network dynamic CE module 910 as described with reference to FIGS. 9-12. In some examples, a network entity may execute a set of codes to control the functional elements of the network entity to perform the functions described below. Additionally or alternatively, the network entity may perform aspects the functions described below using special-purpose hardware. The method 1600 may also incorporate aspects of methods 1300, 1400, and 1500 of FIGS. 13-15.

At block 1605, the network entity may identify a dynamic CE configuration for a wireless device as described with reference to FIGS. 2-4. In certain examples, the operations of block 1605 may be performed by the NW dynamic CE configuration module 1005 as described with reference to FIG. 10.

At block 1610, the network entity may transmit a first paging message for the wireless device according to a first CE level of the dynamic CE configuration as described with reference to FIGS. 2-4. In certain examples, the operations of block 1610 may be performed by the NW paging module 1010 as described with reference to FIG. 10.

At block 1615, the network entity may determine that the wireless device has not responded to the first paging message as described with reference to FIGS. 2-4. In certain examples, the operations of block 1615 may be performed by the paging module 620 as described with reference to FIG. 6.

At block 1620, the network entity may transmit a second paging message for the wireless device according to a second CE level of the dynamic CE configuration based on the determination as described with reference to FIGS. 2-4. In certain examples, the operations of block 1620 may be performed by the NW CE selection module 1015 as described with reference to FIG. 10.

Figure 17:
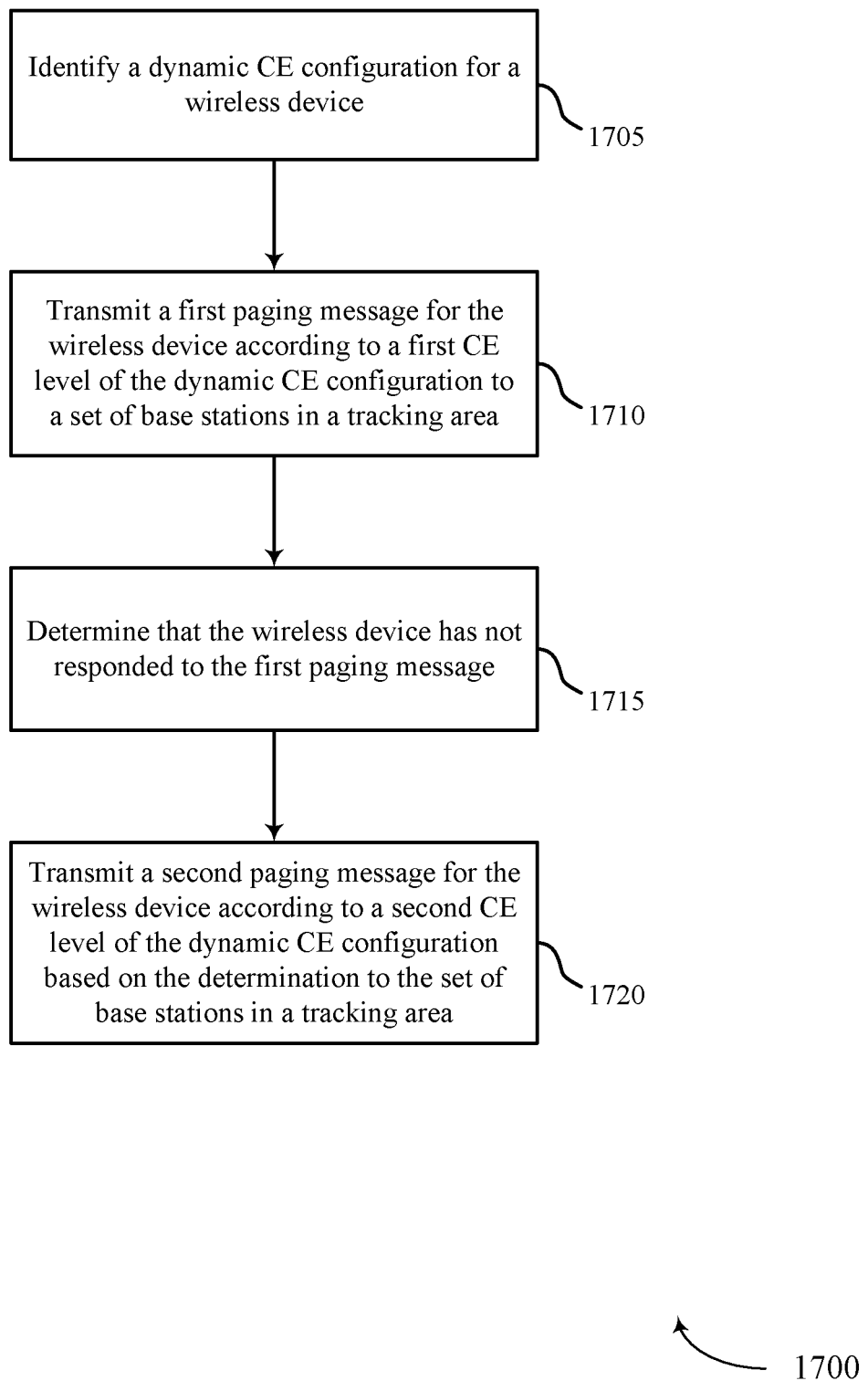

FIG. 17 shows a flowchart illustrating a method 1700 for low cost paging in accordance with various aspects of the present disclosure. The operations of method 1700 may be implemented by a MME 135 or its components as described with reference to FIGS. 1-12. For example, the operations of method 1700 may be performed by the network dynamic CE module 910 as described with reference to FIGS. 9-12. In some examples, a MME 135 may execute a set of codes to control the functional elements of the MME 135 to perform the functions described below. Additionally or alternatively, the MME 135 may perform aspects the functions described below using special-purpose hardware. The method 1700 may also incorporate aspects of methods 1300, 1400, 1500, and 1600 of FIGS. 13-16.

At block 1705, the MME 135 may identify a dynamic CE configuration for a wireless device as described with reference to FIGS. 2-4. In certain examples, the operations of block 1705 may be performed by the NW dynamic CE configuration module 1005 as described with reference to FIG. 10.

At block 1710, the MME 135 may transmit a first paging message for the wireless device according to a first CE level of the dynamic CE configuration as described with reference to FIGS. 2-4. In certain examples, the operations of block 1710 may be performed by the NW paging module 1010 as described with reference to FIG. 10.

At block 1715, the MME 135 may determine that the wireless device has not responded to the first paging message as described with reference to FIGS. 2-4. In certain examples, the operations of block 1715 may be performed by the paging module 620 as described with reference to FIG. 6.

At block 1720, the MME 135 may transmit a second paging message for the wireless device according to a second CE level of the dynamic CE configuration based on the determination as described with reference to FIGS. 2-4. In some cases, transmitting the first paging message or the second paging message includes: sending a paging request to a set of base stations 105 in a tracking area. In certain examples, the operations of block 1720 may be performed by the NW CE selection module 1015 as described with reference to FIG. 10.

Figure 18:
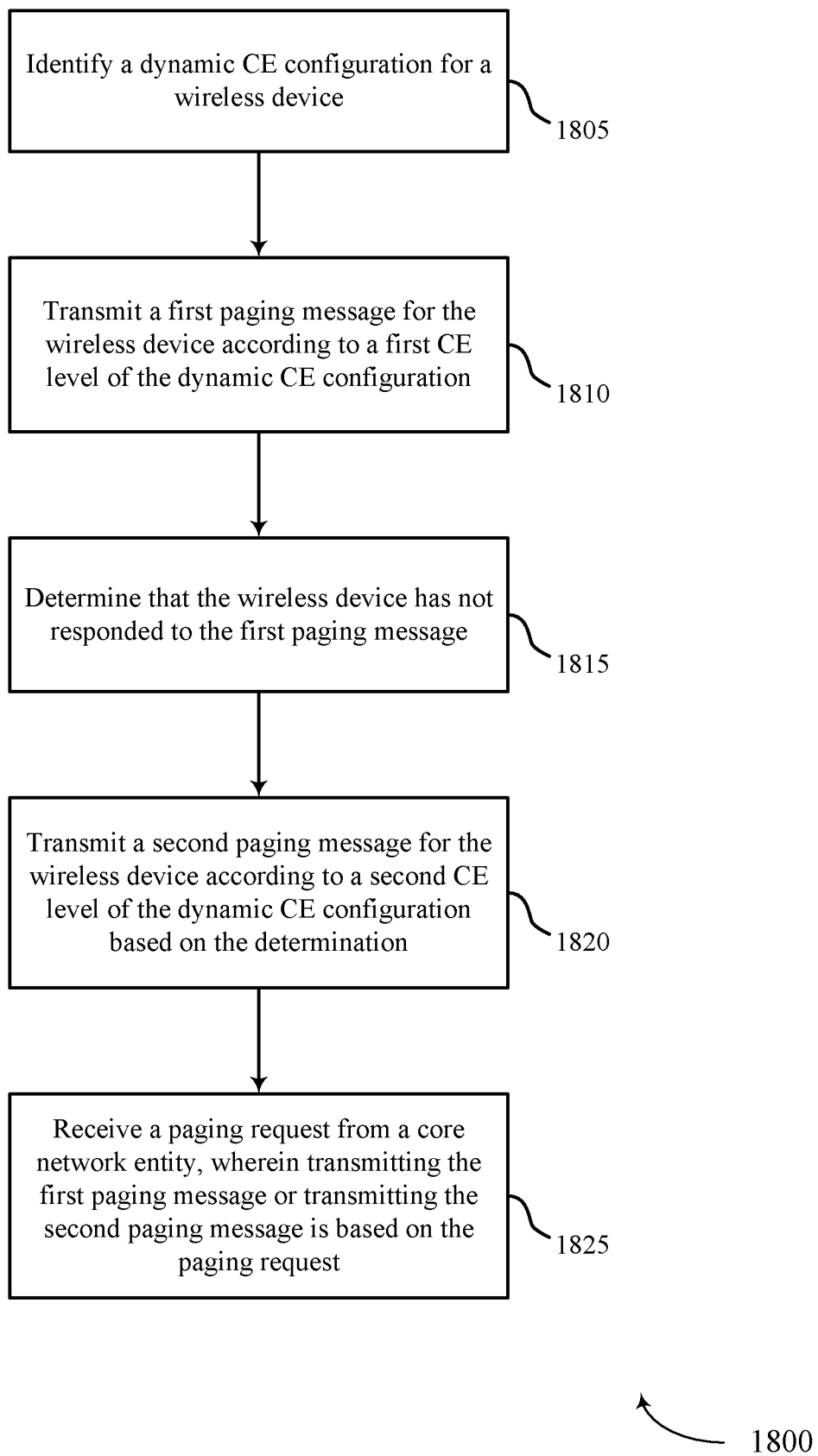

FIG. 18 shows a flowchart illustrating a method 1800 for low cost paging in accordance with various aspects of the present disclosure. The operations of method 1800 may be implemented by a base station 105 or its components as described with reference to FIGS. 1-12. For example, the operations of method 1800 may be performed by the network dynamic CE module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of methods 1300, 1400, 1500, 1600, and 1700 of FIGS. 13-17.

At block 1805, the base station 105 may identify a dynamic CE configuration for a wireless device as described with reference to FIGS. 2-4. In certain examples, the operations of block 1805 may be performed by the NW dynamic CE configuration module 1005 as described with reference to FIG. 10.

At block 1810, the base station 105 may transmit a first paging message for the wireless device according to a first CE level of the dynamic CE configuration as described with reference to FIGS. 2-4. In certain examples, the operations of block 1810 may be performed by the NW paging module 1010 as described with reference to FIG. 10.

At block 1815, the base station 105 may determine that the wireless device has not responded to the first paging message as described with reference to FIGS. 2-4. In certain examples, the operations of block 1815 may be performed by the paging module 620 as described with reference to FIG. 6.

At block 1820, the base station 105 may transmit a second paging message for the wireless device according to a second CE level of the dynamic CE configuration based on the determination as described with reference to FIGS. 2-4. In certain examples, the operations of block 1820 may be performed by the NW CE selection module 1015 as described with reference to FIG. 10.

At block 1825, the base station 105 may receive a paging request from a core network entity, such that transmitting the first paging message or transmitting the second paging message may be based on the paging request as described with reference to FIGS. 2-4. In certain examples, the operations of block 1825 may be performed by the paging module 620 as described with reference to FIG. 6.

Thus, methods 1300, 1400, 1500, 1600, 1700, and 1800 may provide for low cost paging. It should be noted that methods 1300, 1400, 1500, 1600, 1700, and 1800 describe possible implementation, and that the operations and the steps may be rearranged or otherwise modified such that other implementations are possible. In some examples, aspects from two or more of the methods 1300, 1400, 1500, 1600, 1700, and 1800 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-advanced (LTE-a) are new releases of Universal Mobile Telecommunications System (UMTS) that use E-UTRA. UTRA, E-UTRA, UMTS, LTE, LTE-a, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-a networks, including such networks described herein, the term evolved node B (eNB) may be generally used to describe the base stations. The wireless communications system or systems described herein may include a heterogeneous LTE/LTE—a network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
    establishing a dynamic coverage enhancement (CE) configuration with a network entity;
    communicating in a connected mode utilizing a first CE level of the dynamic CE configuration;
    selecting a second CE level of the dynamic CE configuration while in an idle mode; and
    receiving a paging indication transmitted utilizing the second CE level while in the idle mode.

2. The method of claim 1, further comprising:
    communicating in the connected mode utilizing the second CE level based at least in part on the paging indication.

3. The method of claim 1, wherein establishing the dynamic CE configuration with the network entity comprises:
    indicating support for dynamic CE paging.

4. The method of claim 3, wherein the support is indicated to a base station.

5. The method of claim 3, wherein the indicated support is based at least in part on a user configuration, an operator configuration, or both.

6. The method of claim 5, wherein the operator configuration is enabled via an indication of dynamic CE level enabled in a universal subscriber identity module (USIM), via an Open Mobile Alliance Device Management (OMA DM) indication, or both.

7. The method of claim 1, further comprising:
    refraining from signaling an indication that the second CE level has been selected based at least in part on the dynamic CE configuration.

8. The method of claim 1, further comprising:
    monitoring system information for a dynamic CE support indication.

9. The method of claim 8, further comprising:
    determining that a base station supports the dynamic CE configuration based at least in part on the dynamic CE support indication; and
    reselecting the base station while in the idle mode based at least in part on the determination.

10. The method of claim 8, further comprising:
    determining that a base station does not support the dynamic CE configuration based at least in part on the dynamic CE support indication; and
    refraining from reselecting the base station while in the idle mode based at least in part on the determination.

11. The method of claim 8, wherein the dynamic CE support indication depends in part on a configuration, where the configuration comprises a user configuration or an operator configuration, wherein the operator configuration comprises an indication of dynamic CE level enabled in a universal subscriber identity module (USIM), an indication via an Open Mobile Alliance Device Management (OMA DM), or both.

12. The method of claim 1, further comprising:
    measuring a channel condition, wherein selecting the second CE level is based at least in part on the channel condition.

13. The method of claim 1, wherein the second CE level is selected based at least in part on a limitation that the second CE level is higher than the first CE level.

14. An apparatus for wireless communication, comprising:
    means for establishing a dynamic coverage enhancement (CE) configuration with a network entity;
    means for communicating in a connected mode utilizing a first CE level of the dynamic CE configuration;
    means for selecting a second CE level of the dynamic CE configuration while in an idle mode; and
    means for receiving a paging indication transmitted utilizing the second CE level while in the idle mode.

15. An apparatus for wireless communication, comprising:
    a processor;
    memory in electronic communication with the processor; and
    instructions stored in the memory and operable, when executed by the processor, to cause the apparatus to:
        establish a dynamic coverage enhancement (CE) configuration with a network entity;
        communicate in a connected mode utilizing a first CE level of the dynamic CE configuration;
        select a second CE level of the dynamic CE configuration while in an idle mode; and
        receive a paging indication transmitted utilizing the second CE level while in the idle mode.

16. The apparatus of claim 15, wherein the instructions are operable to cause the apparatus to:
    communicate in the connected mode utilizing the second CE level based at least in part on the paging indication.

17. The apparatus of claim 15, wherein establishing the dynamic CE configuration with the network entity comprises:
    indicating support for dynamic CE paging.

18. The apparatus of claim 17, wherein the support is indicated to a base station.

19. The apparatus of claim 17, wherein the indicated support is based at least in part on a user configuration, an operator configuration, or both.

20. The apparatus of claim 19, wherein the operator configuration is enabled via an indication of dynamic CE level enabled in a universal subscriber identity module (USIM), via an Open Mobile Alliance Device Management (OMA DM) indication, or both.

21. The apparatus of claim 15, wherein the instructions are operable to cause the apparatus to:
refrain from signaling an indication that the second CE level has been selected based at least in part on the dynamic CE configuration.

22. The apparatus of claim 15, wherein the instructions are operable to cause the apparatus to:
monitor system information for a dynamic CE support indication.

23. The apparatus of claim 22, wherein the instructions are operable to cause the apparatus to:
determine that a base station supports the dynamic CE configuration based at least in part on the dynamic CE support indication; and
reselect the base station while in the idle mode based at least in part on the determination.

24. The apparatus of claim 22, wherein the instructions are operable to cause the apparatus to:
determine that a base station does not support the dynamic CE configuration based at least in part on the dynamic CE support indication; and
refrain from reselecting the base station while in the idle mode based at least in part on the determination.

25. The apparatus of claim 15, wherein the instructions are operable to cause the apparatus to:
measure a channel condition, wherein selecting the second CE level is based at least in part on the channel condition.

26. The apparatus of claim 15, wherein the second CE level is selected based at least in part on a limitation that the second CE level is higher than the first CE level.

27. The apparatus of claim 22, wherein the dynamic CE support indication depends in part on configuration, where the configuration comprises a user configuration or an operator configuration, wherein the operator configuration comprises an indication of dynamic CE level enabled in a universal subscriber identity module (USIM), an indication via an Open Mobile Alliance Device Management (OMA DM), or both.

28. A non-transitory computer-readable medium storing code for wireless communication, the code comprising instructions executable to:
establish a dynamic coverage enhancement (CE) configuration with a network entity;
communicate in a connected mode utilizing a first CE level of the dynamic CE configuration;
select a second CE level of the dynamic CE configuration while in an idle mode; and
receive a paging indication transmitted utilizing the second CE level while in the idle mode.

* * * * *